United States Patent
Zhao et al.

(10) Patent No.: US 12,464,133 B2
(45) Date of Patent: Nov. 4, 2025

(54) SMOOTH SUB-BLOCK MOTION VECTOR PREDICTION

(71) Applicant: TENCENT AMERICA LLC, Palo Alto, CA (US)

(72) Inventors: Liang Zhao, Sunnyvale, CA (US); Xin Zhao, San Jose, CA (US); Han Gao, San Diego, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 138 days.

(21) Appl. No.: 18/455,309

(22) Filed: Aug. 24, 2023

(65) Prior Publication Data

US 2024/0267525 A1   Aug. 8, 2024

Related U.S. Application Data

(60) Provisional application No. 63/443,016, filed on Feb. 2, 2023.

(51) Int. Cl.
*H04N 19/00* (2014.01)
*H04N 19/105* (2014.01)
*H04N 19/137* (2014.01)
*H04N 19/159* (2014.01)
*H04N 19/176* (2014.01)
*H04N 19/70* (2014.01)

(52) U.S. Cl.
CPC ......... *H04N 19/137* (2014.11); *H04N 19/105* (2014.11); *H04N 19/159* (2014.11); *H04N 19/176* (2014.11); *H04N 19/70* (2014.11)

(58) Field of Classification Search
CPC .................................................... H04N 19/00
See application file for complete search history.

(56) References Cited

U.S. PATENT DOCUMENTS

| | | |
|---|---|---|
| 2016/0105676 A1 | 4/2016 | Pu et al. |
| 2020/0177911 A1 | 6/2020 | Aono et al. |
| 2020/0260077 A1 | 8/2020 | Hinz et al. |
| 2021/0058628 A1 | 2/2021 | Lee |
| 2021/0195197 A1 | 6/2021 | Kato et al. |
| 2022/0078441 A1 | 3/2022 | Chen et al. |
| 2022/0116587 A1* | 4/2022 | Zhao ...................... H04N 19/52 |
| 2022/0150489 A1 | 5/2022 | Zhao et al. |

OTHER PUBLICATIONS

International Search Report and Written Opinion for PCT Application PCT/US23/33339, dated Dec. 13, 2023, 15 pages.
Zhao, X. et al.; "Tool Description for AV1 and libaom"; Document CWG-B078_v1; Alliance for Open Media, Codec Working Group; Oct. 4, 2021; 41 pages.
Karpilovsky, E. et al.; "Proposal: New Inter Modes for AVZ"; Document CWG-B018_v1; Alliance for Open Media, Codec Working Group; Feb. 24, 2021; 6 pages.
International Search Report and Written Opinion of PCT Application PCT/US23/64754, dated Sep. 20, 2023, 13 pages.

* cited by examiner

*Primary Examiner* — Maryam A Nasri
(74) *Attorney, Agent, or Firm* — Crowell & Moring LLP

(57) ABSTRACT

This disclosure relates generally to video coding and particularly to smooth-sub-block motion compensation, disclosing methods and systems for determining subblock motion vectors of a video block based on motion information of its spatial neighboring block, temporal blocs spatially co-located with the neighboring blocks, or co-located temporal block of the video block.

19 Claims, 13 Drawing Sheets

SMOOTH SUB-BLOCK MOTION VECTOR PREDICTION

INCORPORATION BY REFERENCE

This application is based on and claims the benefit of priority to U.S. Provisional Patent Application No. 63/443,016 filed on Feb. 2, 2023 and entitled "Smooth Sub-Block Motion Vector Prediction," which is herein incorporated by reference in its entirety.

TECHNICAL FIELD

This disclosure relates generally to video coding and particularly to methods and systems for sub-block motion compensation.

BACKGROUND

Uncompressed digital video can include a series of pictures, and may specific bitrate requirements for storage, data processing, and for transmission bandwidth in streaming applications. One purpose of video coding and decoding can be the reduction of redundancy in the uncompressed input video signal, through various compression techniques.

SUMMARY

This disclosure relates generally to video coding and particularly to smooth-sub-block motion compensation, disclosing methods and systems for determining subblock motion vectors of a video block based on motion information of its spatial neighboring block, temporal blocs spatially co-located with the neighboring blocks, or co-located temporal block of the video block.

In an example implementation, a method for decoding a video block comprising a plurality of sub-blocks of a current frame in a video bitstream is disclosed. The method may include receiving a syntax element signaled in the video bitstream indicative of whether the video block is inter-predicted under a sub-block motion compensation mode; determining based on a value of the received syntax element that the video block is to be inter-predicted under a sub-block motion compensation mode; determining a set of reference motion vectors corresponding to a set of neighboring block or sub-block positions of the video block based on available candidate motion vectors containing motion information of one or more neighboring blocks of the video block in the current frame and temporal blocks of the video block, and deriving a sub-block motion vector for each of the plurality of sub-blocks based on the reference motion vectors.

Aspects of the disclosure also provide an electronic device or apparatus including a circuitry or processor configured to carry out any of the method implementations above.

Aspects of the disclosure also provide non-transitory computer-readable mediums storing instructions which when executed by an electronic device, cause the electronic device to perform any one of the method implementations above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Throughout the specification and claims, terms may have nuanced meanings suggested or implied in context beyond an explicitly stated meaning. The phrase "in one embodiment/implementation" or "in some embodiments/implementations" as used herein does not necessarily refer to the same embodiment/implementation and the phrase "in another embodiment/implementation" or "in other embodiments" as used herein does not necessarily refer to a different embodiment. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of context-dependent meanings. Typically, "or" if used to associate a list, such as A, B or C, is intended to mean A, B, and C, here used in the inclusive sense, as well as A, B or C, here used in the exclusive sense. In addition, the term "one or more". "at least one", "a", "an", or "the" as used herein, depending at least in part upon context, may be used in a singular sense or plural sense. In addition, the term "based on" or "determined by" may be understood as not necessarily intended to convey an exclusive set of factors and may, instead, allow for existence of additional factors not necessarily expressly described, again, depending at least in part on context.

Figure 1:
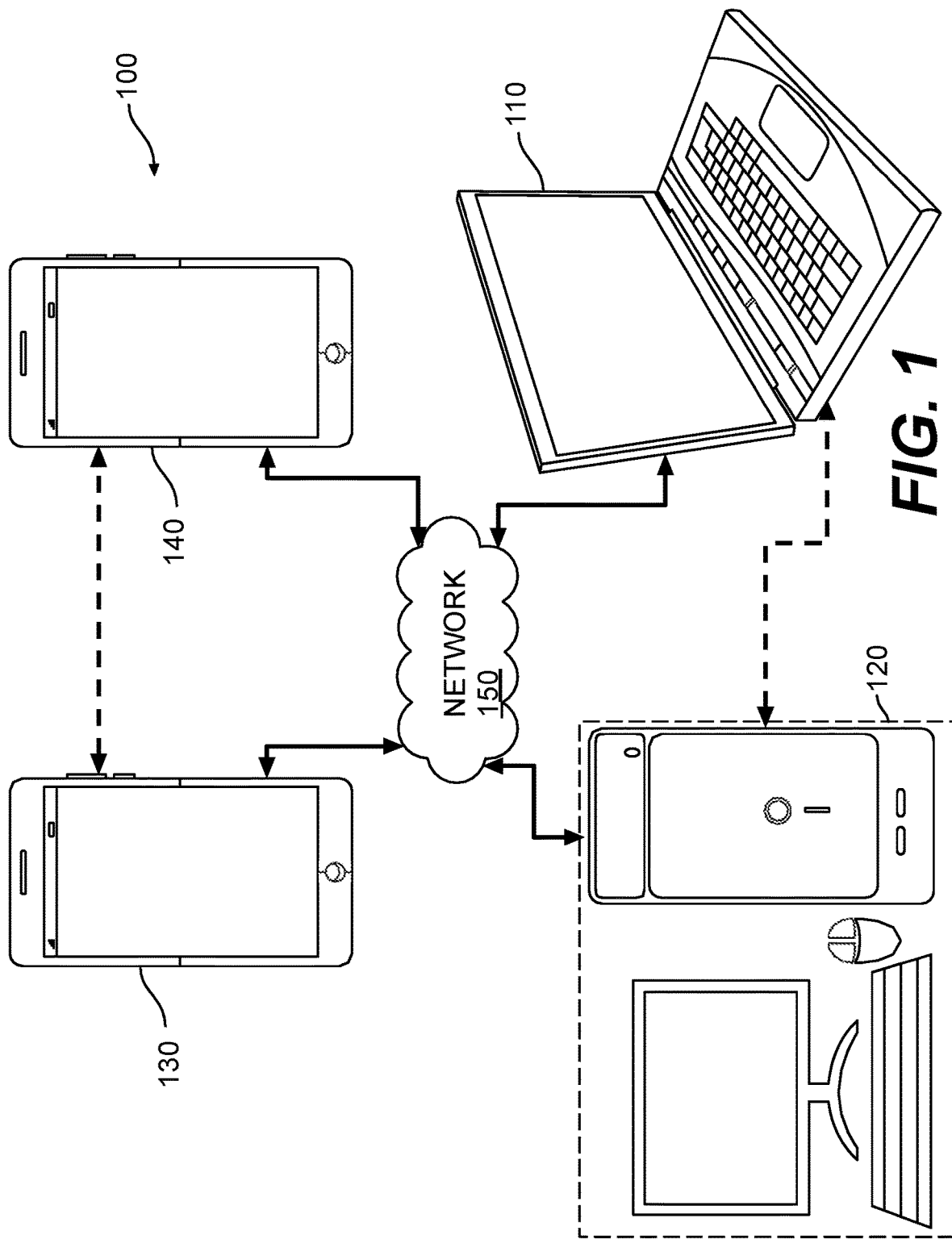
FIG. 1 shows a schematic illustration of a simplified block diagram of a communication system (100) in accordance with an example embodiment.

FIG. 1 illustrates a simplified block diagram of a communication system (100) according to an embodiment of the present disclosure. The communication system (100) includes a plurality of terminal devices, e.g., 110, 120, 130, and 140 that can communicate with each other, via, for example, a network (150). In the example of FIG. 1, the first pair of terminal devices (110) and (120) may perform unidirectional transmission of data. For example, the terminal device (110) may code video data in the form of one or more coded bitstreams (e.g., of a stream of video pictures that are captured by the terminal device (110)) for transmission via the network (150). The terminal device (120) may receive the coded video data from the network (150), decode the coded video data to recover the video pictures and display the video pictures according to the recovered video data. Unidirectional data transmission may be implemented in media serving applications and the like.

In another example, the second pair of terminal devices (130) and (140) may perform bidirectional transmission of coded video data, for example, during a videoconferencing application. For bidirectional transmission of data, in an example, each of the terminal devices (130) and (140) may code video data (e.g., of a stream of video pictures that are captured by the terminal device) for transmission to and may also receive coded video data from another of the terminal devices (130) and (140) to recover and display the video pictures.

In the example of FIG. 1, the terminal devices may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (150) represents any number or types of networks that convey coded video data among the terminal devices, including for example wireline (wired) and/or wireless communication networks. The communication network (150) may exchange data in circuit-switched, packet-switched, and/or other types of channels. Representative networks include telecommunications networks, local area networks, wide area networks and/or the Internet.

Figure 2:
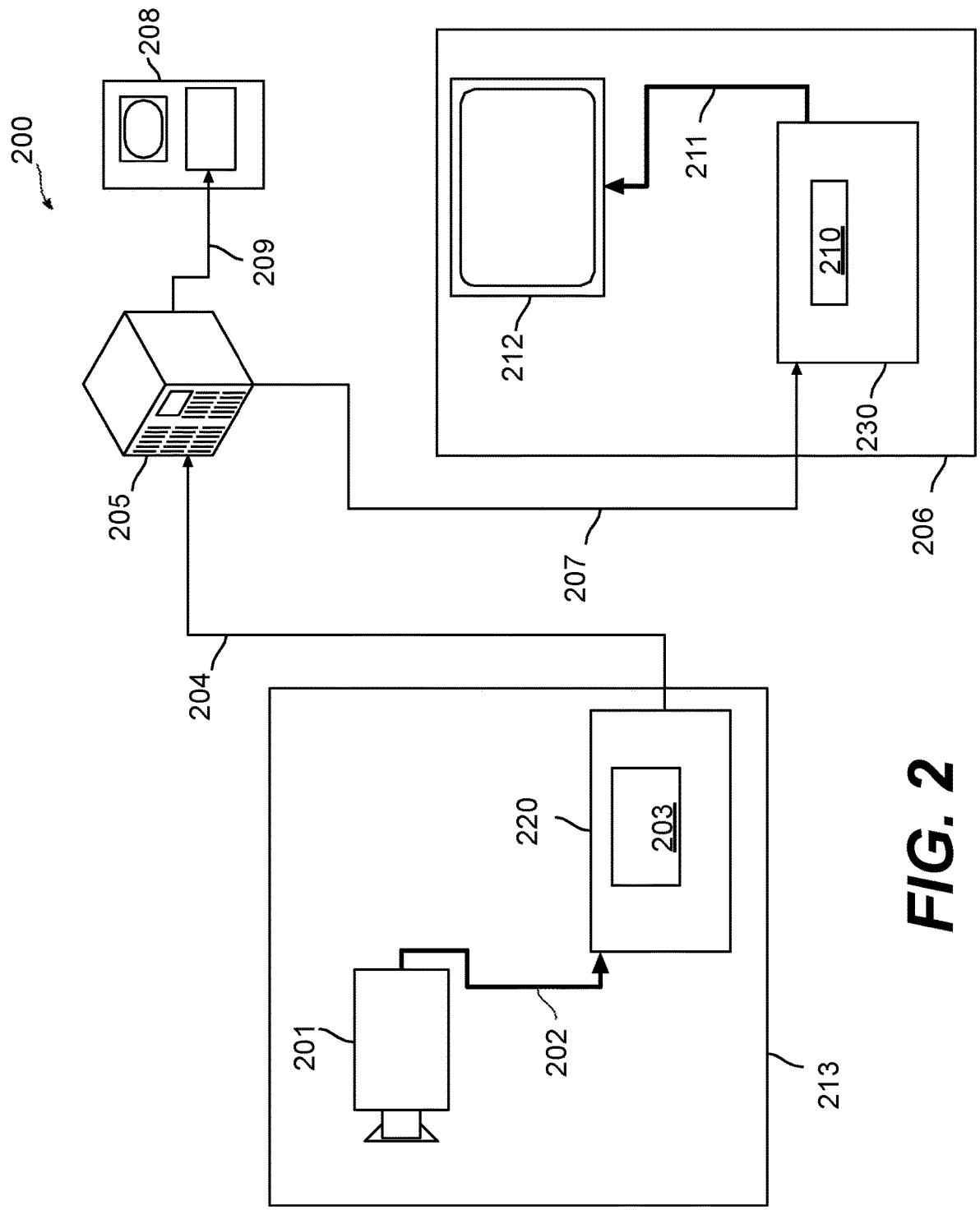
FIG. 2 shows a schematic illustration of a simplified block diagram of a communication system (200) in accordance with an example embodiment.

FIG. 2 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

As shown in FIG. 2, a video streaming system may include a video capture subsystem (213) that can include a video source (201), e.g., a digital camera, for creating a stream of video pictures or images (202) that are uncompressed. In an example, the stream of video pictures (202) includes samples that are recorded by a digital camera of the video source 201. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize a lower data volume when compared to the stream of uncompressed video pictures (202), can be stored on a streaming server (205) for future use or directly to downstream video devices (not shown). One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that are uncompressed and that can be rendered on a display (212) (e.g., a display screen) or other rendering devices (not depicted).

Figure 3:
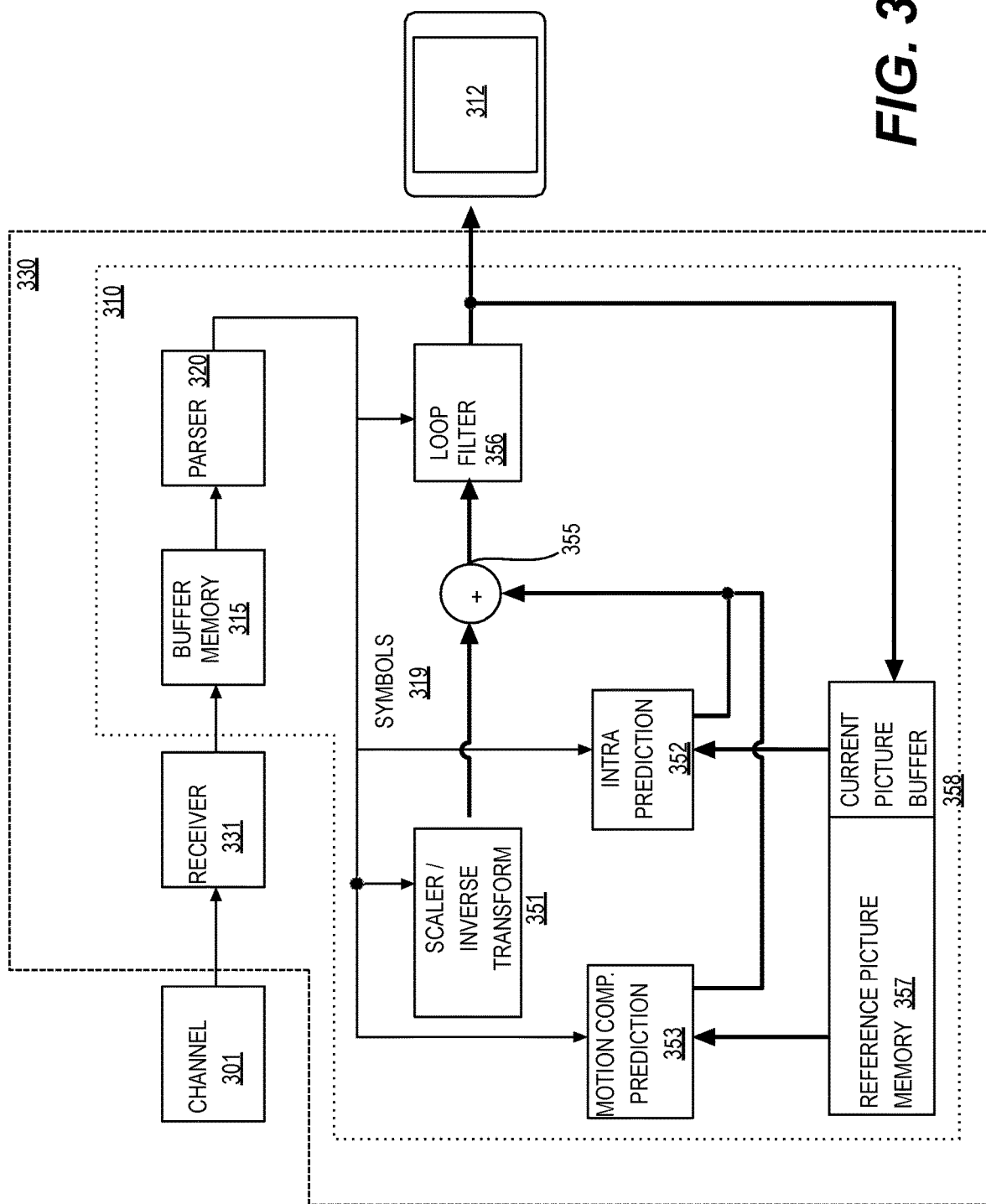
FIG. 3 shows a schematic illustration of a simplified block diagram of a video decoder in accordance with an example embodiment.

FIG. 3 shows a block diagram of a video decoder (310) of an electronic device (330) according to any embodiment of the present disclosure below. The electronic device (330) can include a receiver (331) (e.g., receiving circuitry). The video decoder (310) can be used in place of the video decoder (210) in the example of FIG. 2.

As shown, in FIG., 3, the receiver (331) may receive one or more coded video sequences from a channel (301). To combat network jitter and/or handle playback timing, a buffer memory (315) may be disposed in between the receiver (331) and an entropy decoder/parser (320) ("parser (320)" henceforth). The parser (320) may reconstruct symbols (321) from the coded video sequence. Categories of those symbols include information used to manage operation of the video decoder (310), and potentially information to control a rendering device such as display (312) (e.g., a display screen). The parser (320) may parse/entropy-decode the coded video sequence. The parser (320) may extract from the coded video sequence, a set of subgroup parameters for at least one of the subgroups of pixels in the video decoder. The subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients (e.g., Fourier transform coefficients), quantizer parameter values, motion vectors, and so forth. Reconstruction of the symbols (321) can involve multiple different processing or functional units. The units that are involved and how they are involved may be controlled by the subgroup control information that was parsed from the coded video sequence by the parser (320).

A first unit may include the scaler/inverse transform unit (351). The scaler/inverse transform unit (351) may receive a quantized transform coefficient as well as control information, including information indicating which type of inverse transform to use, block size, quantization factor/parameters, quantization scaling matrices, and the lie as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block, i.e., a block that does not use predictive information from previously reconstructed pictures, but can use predictive information from previously reconstructed parts of the current picture. Such predictive information can be provided by an intra picture prediction unit (352). In some cases, the intra picture prediction unit (352) may generate a block of the same size and shape of the block under reconstruction using surrounding block information that is already reconstructed and stored in the current picture buffer (358). The current picture buffer (358) buffers, for example, partly reconstructed current picture and/or fully reconstructed current picture. The aggregator (355), in some implementations, may add, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) based on motion vector to fetch samples used for inter-picture prediction. After motion compensating the fetched reference samples in accordance with the symbols (321) pertaining to the block, these samples can be added by the aggregator (355) to the output of the scaler/inverse transform unit (351) (output of unit 351 may be referred to as the residual samples or residual signal) so as to generate output sample information.

The output samples of the aggregator (355) can be subject to various loop filtering techniques in the loop filter unit (356) including several types of loop filters. The output of the loop filter unit (356) can be a sample stream that can be output to the rendering device (312) as well as stored in the reference picture memory (357) for use in future inter-picture prediction.

Figure 4:
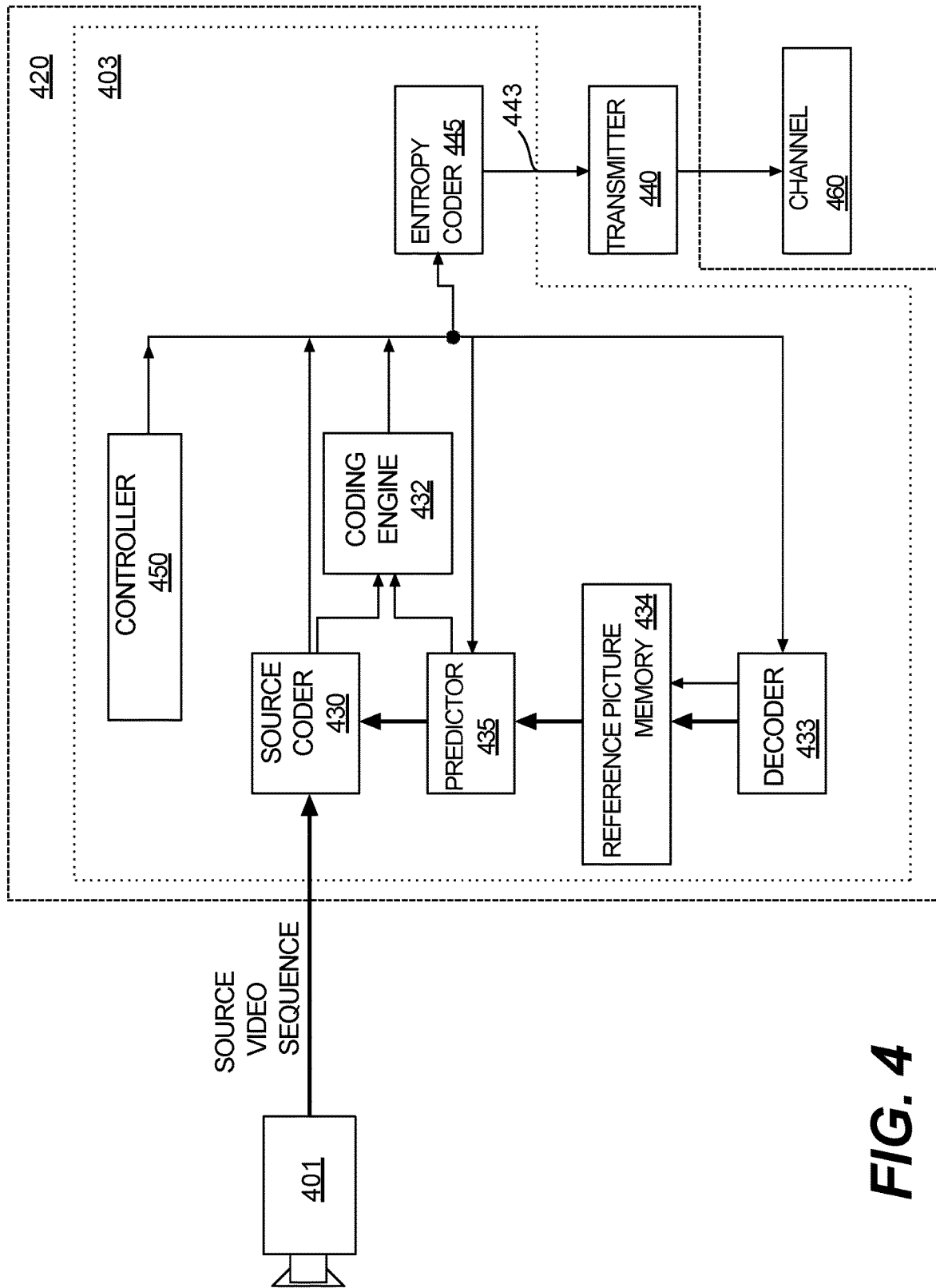
FIG. 4 shows a schematic illustration of a simplified block diagram of a video encoder in accordance with an example embodiment.

FIG. 4 shows a block diagram of a video encoder (403) according to an example embodiment of the present disclosure. The video encoder (403) may be included in an electronic device (420). The electronic device (420) may further include a transmitter (440) (e.g., transmitting circuitry). The video encoder (403) can be used in place of the video encoder (403) in the example of FIG. 4.

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques, . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bitstream in entropy coding may be lossless in the video compression technologies considered in the disclosed subject matter). An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types: an Intra Picture (I picture), a predictive picture (P picture), a bi-directionally predictive picture (B Picture), a multiple-predictive pictures. Source pictures commonly may be subdivided spatially into a plurality of sample coding blocks as described in further detail below.

Figure 5:
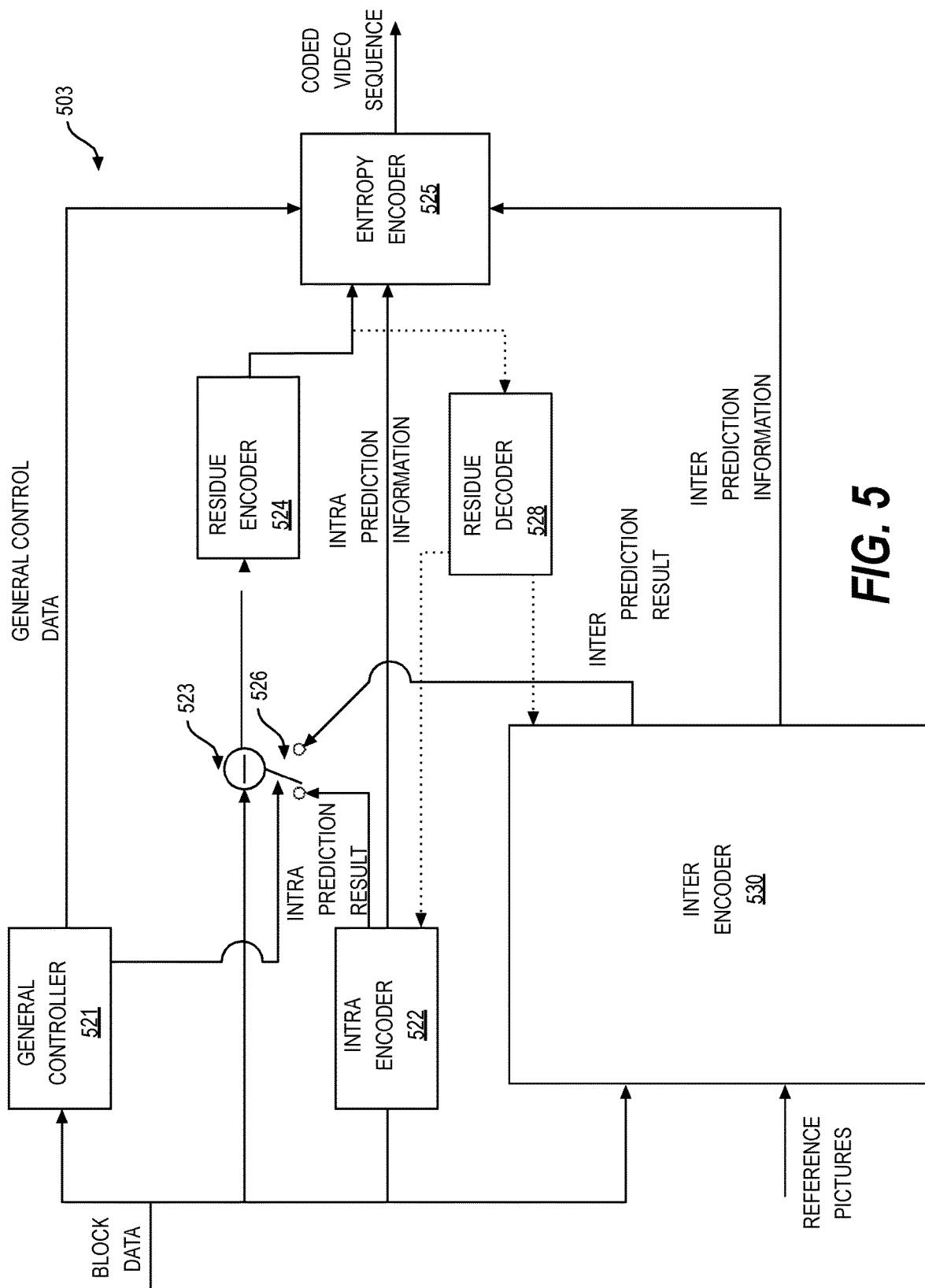
FIG. 5 shows a block diagram of a video encoder in accordance with another example embodiment.

FIG. 5 shows a diagram of a video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. The example video encoder (503) may be used in place of the video encoder (403) in the FIG. 4 example.

For example, the video encoder (503) receives a matrix of sample values for a processing block. The video encoder (503) then determines whether the processing block is best coded using intra mode, inter mode, or bi-prediction mode using, for example, rate-distortion optimization (RDO).

In the example of FIG. 5, the video encoder (503) includes an inter encoder (530), an intra encoder (522), a residue calculator (523), a switch (526), a residue encoder (524), a general controller (521), and an entropy encoder (525) coupled together as shown in the example arrangement in FIG. 5.

The inter encoder (530) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques).

The general controller (521) may be configured to determine general control data and control other components of the video encoder (503) based on the general control data to, for example, determine the prediction mode of the block and provides a control signal to the switch (526) based on the prediction mode.

The residue calculator (523) may be configured to calculate a difference (residue data) between the received block and prediction results for the block selected from the intra encoder (522) or the inter encoder (530). The residue encoder (524) may be configured to encode the residue data to generate transform coefficients. The transform coefficients are then subject to quantization processing to obtain quantized transform coefficients. In various example embodiments, the video encoder (503) also includes a residual decoder (528). The residual decoder (528) is configured to perform inverse-transform, and generate the decoded residue data. The entropy encoder (525) may be configured to format the bitstream to include the encoded block and perform entropy coding.

Figure 6:
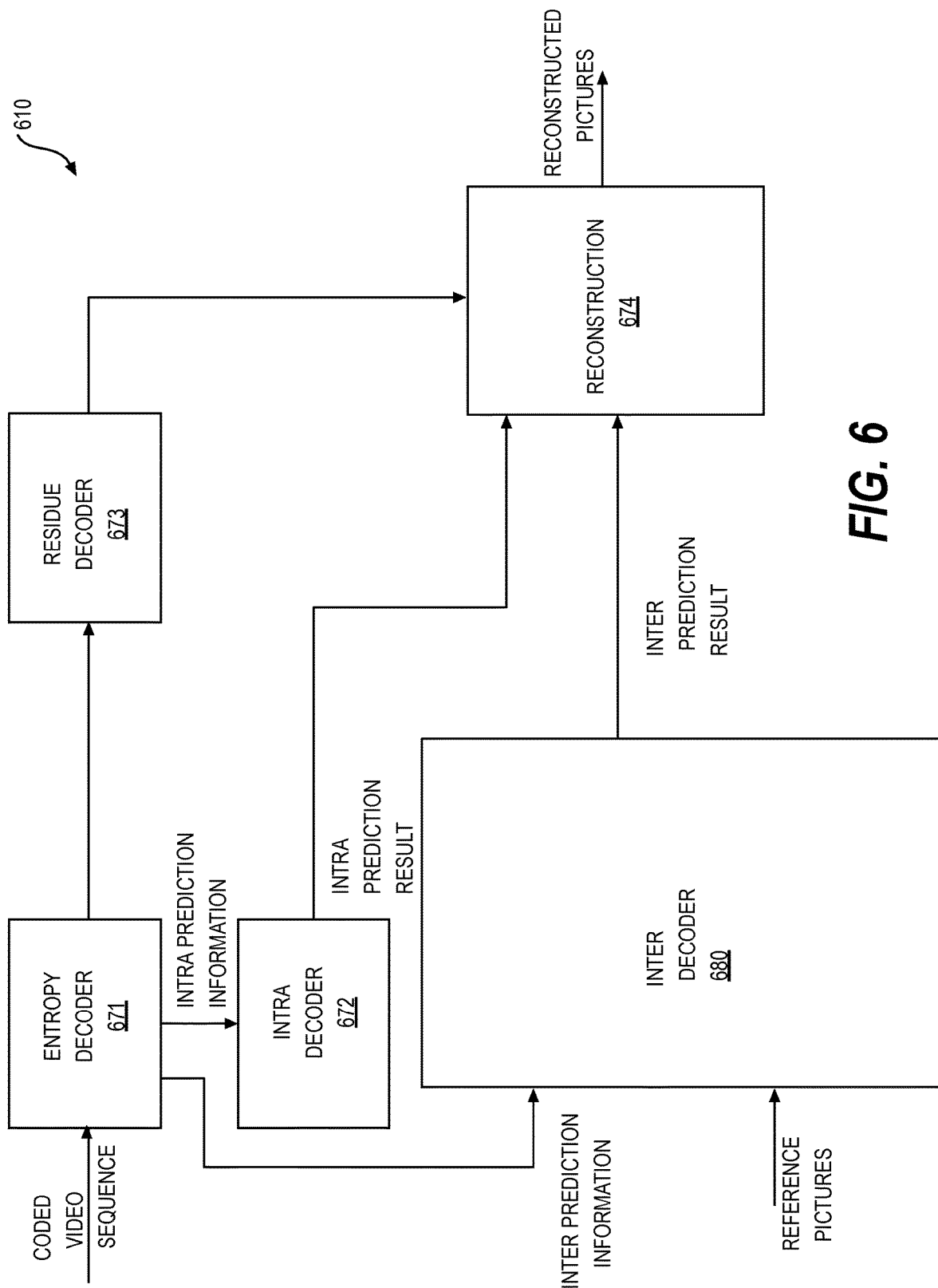
FIG. 6 shows a block diagram of a video decoder in accordance with another example embodiment.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In an example, the video decoder (610) may be used in place of the video decoder (410) in the example of FIG. 4.

In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

It is noted that the video encoders (203), (403), and (503), and the video decoders (210), (310), and (610) can be implemented using any suitable technique. In some example embodiments, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. After dividing or partitioning a base block following any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB). For the various example partitioning implementations described further below, each resulting CB may be of any of the allowed sizes and partitioning levels. Such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The CB tree structure of each color may be referred to as coding block tree (CBT). The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same.

In some implementations, partition tree schemes or structures used for the luma and chroma channels may not need to be the same. In other words, luma and chroma channels may have separate coding tree structures or patterns. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, a luma channel may be partitioned into CBs by one coding partition tree structure, and a chroma channel may be partitioned into chroma CBs by another coding partition tree structure.

Figure 7:
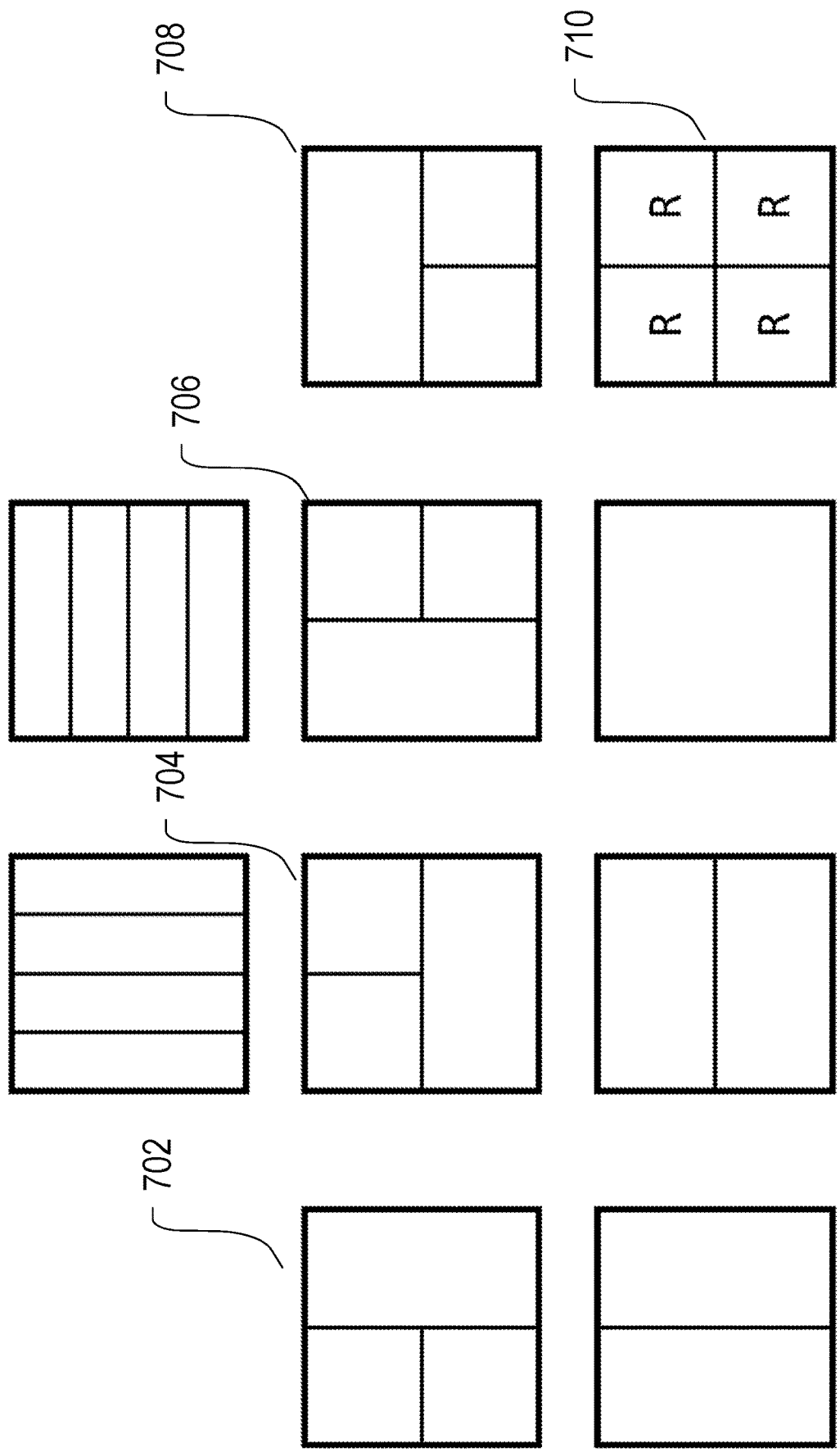
FIG. 7 shows a scheme of coding block partitioning according to example embodiments of the disclosure.

FIG. 7 shows an example predefined 10-way partitioning structure/pattern allowing recursive partitioning to form a partitioning tree. The root block may start at a predefined level (e.g. from a base block at 128×128 or 64×64 level). The example partitioning structure of FIG. 7 includes various 2:1/1:2 and 4:1/1:4 rectangular partitions. In some example implementations, none of the rectangular partitions of FIG. 7 is allowed to be further subdivided. A coding tree depth may be further defined to indicate the splitting depth from the root node or root block. For example, the coding tree depth for the root node or root block may be set to 0, and after the root block is further split once following FIG. 7, the coding tree depth is increased by 1. In some implementations, only the all-square partitions in 710 may be allowed for recursive partitioning into the next level of the partitioning tree following pattern of FIG. 7.

In some other example implementations for coding block partitioning, a quadtree structure may be used. Such quadtree splitting may be applied hierarchically and recursively to any square shaped partitions. Whether a base block or an intermediate block or partition is further quadtree split may be adapted to various local characteristics of the base block or intermediate block/partition.

Figure 8:
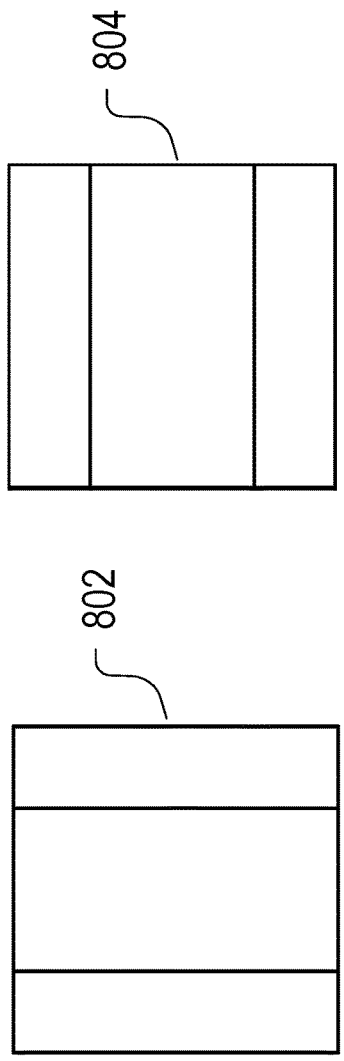
FIG. 8 shows another scheme of coding block partitioning according to example embodiments of the disclosure.

In yet some other examples, a ternary partitioning scheme may be used for partitioning a base block or any intermediate block, as shown in FIG. 8. The ternary pattern may be implemented vertical, as shown in 802, or horizontal, as shown in 804. While the example split ratio in FIG. 8 is shown as 1:2:1, other ratios may be predefined. In some implementations, two or more different ratios may be predefined. In some implementations, the width and height of the partitions of the example triple trees are always power of 2 to avoid additional transforms.

Figure 9:
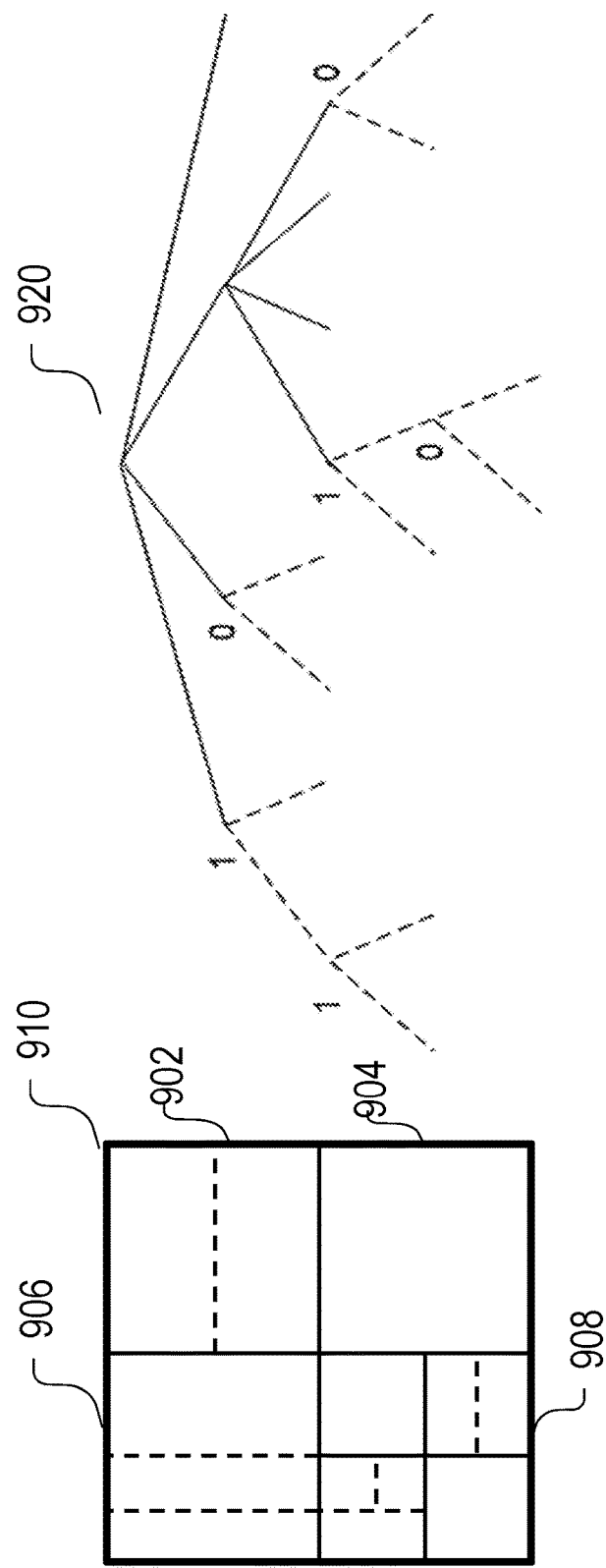
FIG. 9 shows another scheme of coding block partitioning according to example embodiments of the disclosure.

The above partitioning schemes may be combined in any manner at different partitioning levels. As one example, the quadtree and the binary partitioning schemes described above may be combined to partition a base block into a quadtree-binary-tree (QTBT) structure. In such a scheme, a base block or an intermediate block/partition may be either quadtree split or binary split, subject to a set of predefined conditions, if specified. A particular example is illustrated in FIG. 9, where a base block is first quadtree split into four partitions, as shown by 902, 904, 906, and 908. Thereafter, each of the resulting partitions is either quadtree partitioned into four further partitions (such as 908), or binarily split into two further partitions (either horizontally or vertically, such as 902 or 906, both being symmetric, for example) at the next level, or non-split (such as 904). Binary or quadtree splitting may be allowed recursively for square shaped partitions, as shown by the overall example partition pattern of 910 and the corresponding tree structure/representation in 920, in which the solid lines represent quadtree splitting, and the dashed lines represent binary splitting. Flags may be used for each binary splitting node (non-leaf binary partitions) to indicate whether the binary splitting is horizontal or vertical. For example, as shown in 920, consistent with the partitioning structure of 910, flag "0" may represent horizontal binary splitting, and flag "1" may represent vertical binary splitting. For the quadtree-split partition, there is no need to indicate the splitting type since quadtree splitting always splits a block or a partition both horizontally and vertically to produce 4 sub-blocks/partitions with an equal size. In some implementations, flag "1" may represent horizontal binary splitting, and flag "0" may represent vertical binary splitting.

In some example implementations of the QTBT, the quadtree and binary splitting ruleset may be represented by the following predefined parameters and the corresponding functions associated therewith:

CTU size: the root node size of a quadtree (size of a base block)

MinQTSize: the minimum allowed quadtree leaf node size

MaxBTSize: the maximum allowed binary tree root node size

MaxBTDepth: the maximum allowed binary tree depth

MinBTSize: the minimum allowed binary tree leaf node size

In some example implementations of the QTBT partitioning structure, the CTU size may be set as 128×128 luma samples with two corresponding 64×64 blocks of chroma samples (when an example chroma sub-sampling is considered and used), the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from its minimum allowed size of 16×16 (i.e., the MinQTSize) to 128×128 (i.e., the CTU size). If a node is 128×128, it will not be first split by the binary tree since the size exceeds the MaxBTSize (i.e., 64×64). Otherwise, nodes which do not exceed MaxBTSize could be partitioned by the binary tree. In the example of FIG. 9, the base block is 128×128. The basic block can only be quadtree split, according to the predefined ruleset. The base block has a partitioning depth of 0. Each of the resulting four partitions are 64×64, not exceeding MaxBTSize, may be further quadtree or binary-tree split at level 1. The process continues. When the binary tree depth reaches MaxBTDepth (i.e., 4), no further splitting may be considered. When the binary tree node has width equal to MinBTSize (i.e., 4), no further horizontal splitting may be considered. Similarly, when the binary tree node has height equal to MinBTSize, no further vertical splitting is considered.

In some example implementations, the QTBT scheme above may be configured to support a flexibility for the luma and chroma to have the same QTBT structure or separate QTBT structures. For example, for P and B slices, the luma and chroma CTBs in one CTU may share the same QTBT structure. However, for I slices, the luma CTBs maybe partitioned into CBs by a QTBT structure, and the chroma CTBs may be partitioned into chroma CBs by another QTBT structure. This means that a CU may be used to refer to different color channels in an I slice. e.g., the I slice may consist of a coding block of the luma component or coding blocks of two chroma components, and a CU in a P or B slice may consist of coding blocks of all three colour components.

The various CB partitioning schemes above and the further partitioning of CBs into PBs may be combined in any manner. The following particular implementations are provided as non-limiting examples.

Inter-prediction may be implemented, for example, in a single-reference mode or a compound-reference mode. In some implementations, a skip flag may be first included in the bitstream for a current block (or at a higher level) to indicate whether the current block is inter-coded and is not to be skipped. If the current block is inter-coded, then another flag may be further included in the bitstream as a signal to indicate whether the single-reference mode or compound-reference mode is used for the prediction of the current block. For the single-reference mode, one reference block may be used to generate the prediction block for the current block. For the compound-reference mode, two or more reference blocks may be used to generate the prediction block by, for example, weighted average. The reference block or reference blocks may be identified using reference frame index or indices and additionally using corresponding motion vector or motion vectors which indicate shift(s) between the reference block(s) and the current blocks in location relative to a frame, e.g., in horizontal and vertical pixels. For example, the inter-prediction block for the current block may be generated from a single-reference block identified by one motion vector in a reference frame as the prediction block in the single-reference mode, whereas for the compound-reference mode, the prediction block may be generated by a weighted average of two reference blocks in two reference frames indicated by two reference frame indices and two corresponding motion vectors. The motion vector(s) may be coded and included in the bitstream in various manners.

In some example implementations, one or more reference picture lists containing identification of short-term and long-term reference frames for inter-prediction may be formed based on the information in the Reference Picture Set (RPS). For example, a single picture reference list may be formed for uni-directional inter-prediction, denoted as L0 reference (or reference list 0) whereas two picture referenced lists may be formed for bi-direction inter-prediction, denoted as L0 (or reference list 0) and L1 (or reference list 1) for each of the two prediction directions. The reference frames included in the L0 and L1 lists may be ordered in various predetermined manners. The lengths of the L0 and L1 lists may be signaled in the video bitstream. Uni-directional inter-prediction may be either in the single-reference mode, or in the compound-reference mode when the multiple references for the generation of prediction block by weighted average in the compound prediction mode are on a same side of the frame where the block to be predicted is located. Bi-directional inter-prediction may only be compound mode in that bi-directional inter-prediction involves at least two reference blocks.

In some implementations, a merge mode (MM) for inter-prediction may be implemented. Generally, for the merge mode, the motion vector in single-reference prediction or one or more of the motion vectors in compound-reference prediction for the current PB may be derived from other motion vector(s) rather than being computed and signaled independently. For example, in an encoding system, the current motion vector(s) for the current PB may be represented by difference(s) between the current motion vector(s) and other one or more already encoded motion vectors (referred to as reference motion vectors). Such difference(s) in motion vector(s) rather than the entirety of the current motion vector(s) may be encoded and included in the bit stream and may be linked to the reference motion vector(s). Correspondingly in a decoding system, the motion vector(s) corresponding to the current PB may be derived based on the decoded motion vector difference(s) and decoded reference motion vector(s) linked therewith. As a specific form of the general merge mode (MM) inter-prediction, such inter-prediction based on motion vector difference(s) may be referred to as Merge Mode with Motion Vector Difference (MMVD). MM in general or MMVD in particular may thus be implemented to leverage correlations between motion vectors associated with different PBs to improve coding efficiency. For example, neighboring PBs may have similar motion vectors and thus the MVD may be small and can be efficiently coded. For another example, motion vectors may correlate temporally (between frames) for similarly located/positioned blocks in space.

In some example implementations of MMVD, a list of reference motion vector (RMV) or MV predictor candidates for motion vector prediction may be formed for a block being predicted. The list of RMV candidates may contain a predetermined number (e.g., 2) of MV predictor candidate blocks whose motion vectors may be used for predicting the current motion vector. The RMV candidate blocks may include blocks selected from neighboring blocks in the same frame and/or temporal blocks (e.g., identically located blocks in proceeding or subsequent frame of the current frame). These options represent blocks at spatial or temporal locations relative to the current block that are likely to have similar or identical motion vectors to the current block. The size of the list of MV predictor candidates may be predetermined. For example, the list may contain two or more candidates. To be on the list of RMV candidates, a candidate block, for example, may be required to have the same reference frame (or frames) as the current block, must exist (e.g., when the current block is near the edge of the frame, a boundary check needs to be performed), and must be already encoded during an encoding process, and/or already decoded during a decoding process. In some implementations, the list of merge candidates may be first populated with spatially neighboring blocks (scanned in particular predefined order) if available and meeting the conditions above, and then the temporal blocks if space is still available in the list. The neighboring RMV candidate blocks, for example, may be selected from left and top blocks of the current bock. The list of RMV predictor candidates may be dynamically formed at various levels (sequence, picture, frame, slice, superblock, etc.) as a Dynamic Reference List (DRL). DRL may be signaled in the bitstream.

In some implementations, an actual MV predictor candidate being used as a reference motion vector for predicting a motion vector of the current block may be signaled. In the case that the RMV candidate list contains two candidates, a one-bit flag, referred to as merge candidate flag may be used to indicate the selection of the reference merge candidate. For a current block being predicted in compound mode, each of the multiple motion vectors predicted using an MV predictor may be associated with reference motion vector from the merge candidate list. The encoder may determine which of the RMV candidate more closely predicts the MV of a current coding block and signal the selection as an index into the DRL.

In some example implementations of MMVD, after an RMV candidate is selected and used as base motion vector predictor for a motion vector to be predicted, a motion vector difference (MVD or a delta MV, representing the difference between the motion vector to be predicted and the reference candidate motion vector) may be calculated in the encoding system. Such MVD may include information representing a magnitude of MV difference and a direction of the MV difference, both of which may be signaled in the bitstream in various manners.

In some example implementations of the MMVD, a distance index may be used to specify magnitude information of the motion vector difference and to indicate one of a set of pre-defined offsets representing predefined motion vector difference from the starting point (the reference motion vector). An MV offset according to the signaled index may then be added to either horizontal or vertical component of the starting (reference) motion vector. An example predefined relation between distance index and predefined offsets is specified in Table 1.

TABLE 1

Example relation of distance index and pre-defined MV offset

| Distance Index | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

In some example implementations of the MMVD, a direction index may be further signaled and used to represent a direction of the MVD relative to the reference motion vector. In some implementations, the direction may be restricted to either one of the horizontal and vertical directions. An example 2-bit direction index is shown in Table 2. In the example of Table 2, the interpretation of the MVD could be variant according to the information of the starting/reference MVs. For example, when the starting/reference MV corresponds to a uni-prediction block or corresponds to a bi-prediction block with both reference frame lists point to the same side of the current picture (i.e. POCs of the two reference pictures are both larger than the POC of the current picture, or are both smaller than the POC of the current picture), the sign in Table 2 may specify the sign (direction) of MV offset added to the starting/reference MV. When the starting/reference MV corresponds to a bi-prediction block with the two reference pictures at different sides of the current picture (i.e. the POC of one reference picture is larger than the POC of the current picture, and the POC of the other reference picture is smaller than the POC of the current picture), and a difference between the reference POC in picture reference list 0 and the current frame is greater than that between the reference POC in picture reference list 1 and the current frame, the sign in Table 2 may specify the sign of MV offset added to the reference MV corresponding to the reference picture in picture reference list 0, and the sign for the offset of the MV corresponding to the reference picture in picture reference list 1 may have an opposite value (opposite sign for the offset). Otherwise, if the difference between the reference POC in picture reference list 1 and the current frame is greater than that between the reference POC in picture reference list 0 and the current frame, the sign in Table 2 may then specify the sign of MV offset added to the reference MV associated with the picture reference list 1 and the sign for the offset to the reference MV associated with the picture reference list 0 has opposite value.

TABLE 2

Example implementations for sign of MV offset specified by direction index

| Direction IDX | 00 | 01 | 10 | 11 |
|---|---|---|---|---|
| x-axis (horizontal) | + | − | N/A | N/A |
| y-axis (vertical) | N/A | N/A | + | − |

In some example implementations, the MVD may be scaled according to the difference of POCs in each direction. If the differences of POCs in both lists are the same, no scaling is needed. Otherwise, if the difference of POC in reference list 0 is larger than the one of reference list 1, the MVD for reference list 1 is scaled. If the POC difference of reference list 1 is greater than list 0, the MVD for list 0 may be scaled in the same way. If the starting MV is uni-predicted, the MVD is added to the available or reference MV.

In some example implementations of MVD coding and signaling for bi-directional compound prediction, in addition or alternative to separately coding and signaling the two MVDs, a symmetric MVD coding may be implemented such that only one MVD needs signaling and the other MVD may be derived from the signaled MVD. In such implementations, motion information including reference picture indices of list-0 and list-1 are not both signaled. Specifically, at a slice level, a flag may be included in the bitstream, referred to as "mvd_l1_zero_flag," for indicating whether the reference list-1 is not signaled in the bitstream. If this flag is 1, indicating that reference list-1 is equal to zero (and thus not signaled), then a bi-directional-prediction flag, referred to as "BiDirPredFlag" may be set to 0, meaning that there is no bi-directional-prediction. Otherwise, if mvd_l1_zero_flag is zero, if the nearest reference picture in list-0 and the nearest reference picture in list-1 form a forward and backward pair of reference pictures or a backward and forward pair of reference pictures, BiDirPredFlag may be set to 1, and both list-0 and list-1 reference pictures are short-term reference pictures. Otherwise BiDirPredFlag is set to 0. BiDirPredFlag of 1 may indicate that a symmetrical mode flag is additionally signalled in the bitstream. The decoder may extract the symmetrical mode flag from the bitstream when BiDirPredFlag is 1. The symmetrical mode flag, for example, may be signaled (if needed) at the CU level and it may indicate whether the symmetrical MVD coding mode is being used for the corresponding CU. When the symmetrical mode flag is 1, it indicates the use of the symmetrical MVD coding mode, and that only reference picture indices of both list-0 and list-1 (referred to as "mvp_l0_flag" and "mvp_l1_flag") are signaled with MVD associated with the list-0 (referred to as "MVD0"), and that the other motion vector difference. "MVD1", is to be derived rather than signaled. For example, MVD1 may be derived as −MVD0. As such, only one MVD is signaled in the example symmetrical MVD mode.

In some other example implementations for MV prediction, a harmonized scheme may be used to implement a general merge mode, MMVD, and some other types of MV prediction, for both single-reference mode and compound-reference mode MV prediction. Various syntax elements may be used to signal the manner in which the MV for a current block is predicted. For example, for single-reference mode, the following MV prediction modes may be signaled:

NEARMV—use one of the motion vector predictors (MVP) in the list indicated by a DRL (Dynamic Reference List) index directly without any MVD.

NEWMV—use one of the motion vector predictors (MVP) in the list signaled by a DRL index as reference and apply a delta to the MVP (e.g., using MVD).

GLOBALMV—use a motion vector based on frame-level global motion parameters.

Likewise, for the compound-reference inter-prediction mode using two reference frames corresponding to two MVs to be predicted, the following MV prediction modes may be signaled:

NEAR_NEARMV—use one of the motion vector predictors (MVP) in the list signaled by a DRL index without MVD for each of the two of MVs to be predicted.

NEAR_NEWMV—for predicting the first of the two motion vectors, use one of the motion vector predictors (MVP) in the list signaled by a DRL index as reference MV without MVD; for predicting the second of the two motion vectors, use one of the motion vector predictors (MVP) in the list signaled by a DRL index as reference MV in conjunction with an additionally signaled delta MV (an MVD).

NEW_NEARMV—for predicting the second of the two motion vectors, use one of the motion vector predictors (MVP) in the list signaled by a DRL index as reference MV without MVD; for predicting the first of the two motion vectors, use one of the motion vector predictors (MVP) in the list signaled by a DRL index as reference MV in conjunction with an additionally signaled delta MV (an MVD).

NEW_NEWMV—use one of the motion vector predictors (MVP) in the list signaled by a DRL index as reference MV and use it in conjunction with an additionally signaled delta MV to predict for each of the two MVs.

GLOBAL_GLOBALMV—use MVs from each reference based on their frame-level global motion parameters.

The term "NEAR" above thus refers to MV prediction using a reference MV without any MVD as a general merge mode, whereas the term "NEW" refers to MV prediction involving using a reference MV and offsetting it with a signaled or derived MVD as in an MMVD mode. For the compound inter-prediction, both the reference base motion vectors and the motion vector deltas above, may be generally different or independent between the two references or the two MVDs, even though the two MVDs, for example, may be correlated and such correlation may be leveraged to reduce the amount of information needed for signaling the two motion vector deltas. To leverage such correlation, a joint signaling of the two MVDs may be implemented and indicated in the bitstream, as described in further detail below.

In some example implementations of MVD, a predefined pixel resolution for the MVD may be allowed. For example, a ⅛-pixel motion vector precision (or accuracy) may be allowed. The MVD described above in the various MV prediction modes may be constructed and signaled in various manners. In some implementations, various syntax elements may be used to signal the motion vector difference(s) above in reference frame list 0 or list 1.

For example, a syntax element referred to as "mv_joint" may specify which components of the motion vector difference associated therewith are non-zero. m For example, mv_joint having a value of 0 may indicate that there is no non-zero MVD along either the horizontal or the vertical direction;

1 may indicate that there is non-zero MVD only along the horizontal direction;

2 may indicate that there is non-zero MVD only along the vertical direction;

3 may indicate that there is non-zero MVD along both the horizontal and the vertical directions.

When the "mv_joint" syntax element for an MVD signals that there is no non-zero MVD component, then no further MVD information may be signaled. However, if the "mv_joint" syntax signals that there is one or two non-zero components, then additional syntax elements may be further signaled for each of the non-zero MVD components as described below.

For example, a syntax element referred to as "mv_sign" may be used to additionally specify whether the corresponding motion vector difference component is positive or negative.

For another example, a syntax element referred to as "mv_class" may be used to specify a class of the motion vector difference among a predefined set of classes for the corresponding non-zero MVD component. The predefined classes for motion vector difference, for example, may be used to divide a contiguous magnitude space of the motion vector difference into non-overlapping ranges of classes. A signaled MVD class thus indicates the magnitude range of the corresponding MVD component. In the example implementation shown in Table 3 below, a higher class corresponds to motion vector differences having range of a larger magnitude. The symbol (n, m] is used for representing a range of motion vector difference that is greater than n pixels, and smaller than or equal to m pixels.

TABLE 3

Magnitude class for motion vector difference

| MV class | Magnitude of MVD |
|---|---|
| MV_CLASS_0 | (0, 2] |
| MV_CLASS_1 | (2, 4] |
| MV_CLASS_2 | (4, 8] |
| MV_CLASS_3 | (8, 16] |
| MV_CLASS_4 | (16, 32] |
| MV_CLASS_5 | (32, 64] |
| MV_CLASS_6 | (64, 128] |
| MV_CLASS_7 | (128, 256] |
| MV_CLASS_8 | (256, 512] |
| MV_CLASS_9 | (512, 1024] |
| MV_CLASS_10 | (1024, 2048] |

In some other examples, a syntax element referred to as "mv_bit" may be further used to specify an integer part of the offset between the non-zero motion vector difference component and starting magnitude of a correspondingly signaled MV class magnitude range. In some other examples, a syntax element referred to as "mv_fr" may be further used to specify first 2 fractional bits of the motion vector difference for a corresponding non-zero MVD component, whereas a syntax element referred to as "mv_hp" may be used to specify a third fractional bit of the motion vector difference (high resolution bit) for a corresponding non-zero MVD component. The two-bit "mv_fr" essentially provides ¼ pixel MVD resolution, whereas the "mv_hp" bit may further provide a ⅛-pixel resolution. In some other implementations, more than one "mv_hp" bit may be used to provide MVD pixel resolution finer than ⅛ pixel. In some example implementations, additional flags may be signaled at one or more of the various levels to indicate whether ⅛-pixel or higher MVD resolution is supported. If MVD resolution is not applied to a particular coding unit, then the syntax elements above for the corresponding non-supported MVD resolution may not be signaled.

However, in some other example implementations, resolution for motion vector difference in various MVD magnitude classes may be differentiated or adaptive. Specifically, high resolution MVD for large MVD magnitude of higher MVD classes may not provide statistically significant improvement in compression efficiency or coding gain. As such, the MVDs may be coded with decreasing or non-increasing resolution (integer pixel resolution or fractional pixel resolution) for larger MVD magnitude ranges, which correspond to higher MVD magnitude classes. The term "resolution" may be further referred to as "pixel resolution"

In some example implementations, each MVD class may be associated with a single allowed resolution. In some other implementations, one or more MVD classes may each be associated with two or more optional MVD pixel resolutions. For example, the adaptively allowed MVD pixel resolution may include but not limited to 1/64-pel (pixel), 1/32-pel, 1/16-pel, ⅛-pel, 1-4-pel, ½-pel, 1-pel, 2-pel, 4-pel . . . (in descending order of resolution).

In some other example implementations, for MV classes equal to or higher than a threshold MV class, only a single MVD value may be allowed. For example, such threshold MV class may be MV_CLASS 2. Thus, MV_CLASS_2 and above may only be allowed to have a single MVD value and without fractional pixel resolution.

Turning to the various compound inter-prediction mode where each MV may be predicted by a reference motion vector and coded by an MVD, the two MVDs may be separately signaled or jointly signaled in the bit stream, as described above. As such, in some example implementations, besides the NEAR_NEARMV, NEAR_NEWMV, NEW_NEARMV, NEW_NEWMV, and GLOBAL_GLOBALMV modes described above, another inter-prediction mode, referred to as JOINT_NEWMV may be introduced for a mode in which the MVDs for joint signaling of reference list 0 and 1. Specifically, if the inter-prediction mode is indicated as NEW_NEWMV, then the MVDs for reference lists 0 and 1 are separately signaled, whereas when the inter-prediction mode is indicated as JOINT_NEWMV mode, the MVDs for reference lists 0 and 1 are jointly signaled. Particularly for the joint MVDs, only one MVD, referred to as joint_delta_mv, may need to be signaled and transmitted in the bitstream, and the MVDs for reference lists 0 and 1 may be derived from joint_delta_mv. The derived MVDs may then be combined with the reference motion vectors in the reference list 0 or 1 to generate the two motion vectors for locating the reference blocks for compound inter-prediction.

In some implementations of compound inter-prediction, the JOINT_NEWMV mode may be signaled together with NEAR_NEARMV, NEAR_NEWMV, NEW_NEARMV, NEW_NEWMV, and GLOBAL_GLOBALMV mode. In such implementations, a syntax may be included in the bitstream for an indication of any one of these alternative compound inter-prediction modes, at any one of various signaling levels (e.g., sequence level, picture level, frame level, slice level, tile level, superblock level, and the like). Alternatively, the JOINT_NEWMV mode may be implemented as a submode of the NEW_NEWMV mode. In other words, under the NEW_NEWMV mode, the two MVDs for the two reference blocks are either jointly signaled (hence the JOINT_NEWMV submode) or not (another submode of the NEW_NEWMV mode). In such an implementation, a first syntax element may be included in the bitstream for indication of any one the NEAR_NEARMV, NEAR_NEWMV, NEW_NEARMV, NEW_NEWMV, and GLOBAL_GLOBALMV modes, and when the first syntax element indicates that NEW_NEWMV mode is selected for the coding block, then a second syntax element may be further included in the bitstream and extractable by a decoder for indicating whether the MVDs for the coding block are separately signaled or jointly signaled.

In some example implementations, when JOINT_NEWMV mode is signaled, and the POC distances between two reference frames and current frame are different, the MVD may scaled for reference list 0 or reference list 1 based on the POC distances. To be specific, the distance between reference frame list 0 and current frame may be denoted as $td_0$ and the distance between reference frame list 1 and current frame may be denoted as $td_1$. If $td_0$ is equal to or larger than $td_1$, joint_med may be directly used for reference list 0 and the MVD for reference list 1 may be derived from joint_mvd based on the equation (1).

$$derived\_mvd = \frac{td1}{td0} * joint\_mvd \qquad (1)$$

Otherwise, if td; equal to or larger than $td_0$, joint_med is directly used for reference list 1 and the MVD for reference list 0 is derived from joint_mvd based on the equation (2).

$$derived\_mvd = \frac{td0}{td1} * joint\_mvd \qquad (2)$$

In some example implementations, another inter coded mode, named as AMVDMV, may be added to single reference case. When AMVDMV mode is selected, it indicates that AMVD (Adaptive Motion Vector Difference) is applied to signal MVD. One flag, e.g., named as amvd_flag, may be added under the JOINT_NEWMV mode to indicate whether AMVD is applied to joint MVD coding mode or not. When adaptive MVD resolution is applied to joint MVD coding mode, MVD for two reference frames are jointly signaled and the precision of MVD may be implicitly determined by MVD magnitudes. Otherwise, MVD for two (or more than two) reference frames are jointly signaled, and conventional MVD coding without adaptive MVD resolution may be applied.

Figure 10:
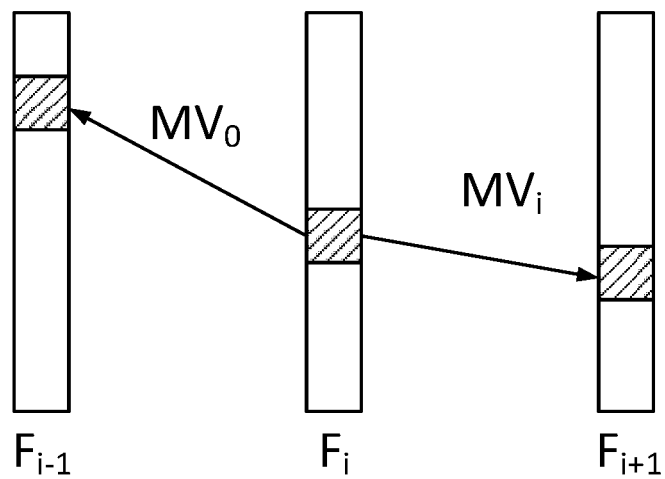
FIG. 10 illustrates compound motion compensation.

Turning to compound inter modes, as shown in FIG. 10, these modes create a prediction of a block in a current frame $F_i$ by combining two hypotheses for motion vectors $MV_0$ and $MV_1$ from two different reference frames $F_{i-1}$ and $F_{i+1}$. As such, two motion information components (e.g., motion vectors) may be signaled in the bitstream per block.

Figure 11:
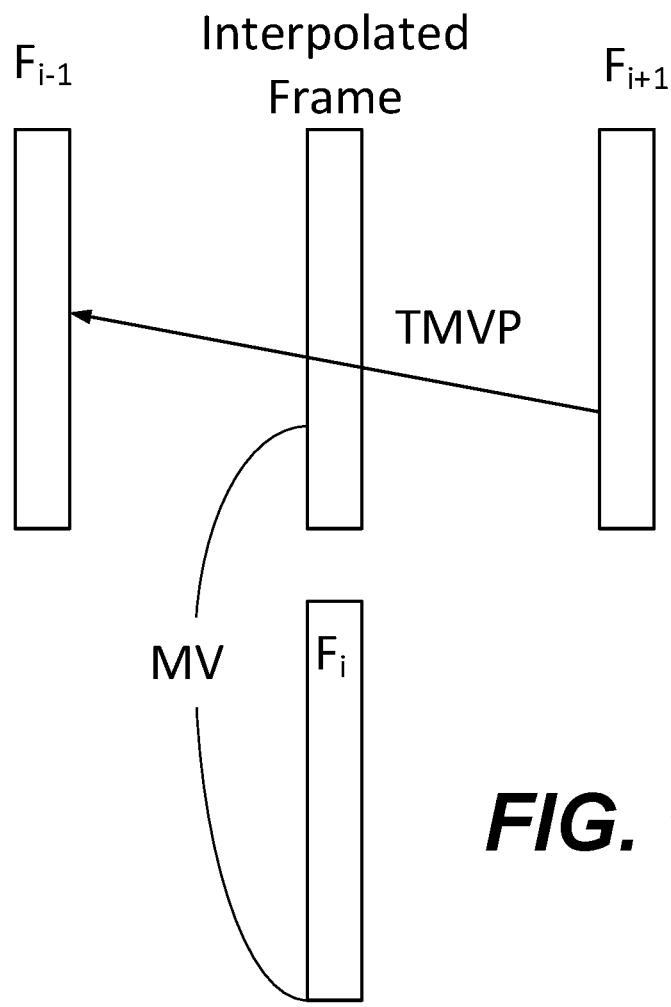
FIG. 11 illustrated example interpolated reference frame for motion compensation.

Alternatively, as shown in FIG. 11, the information in two reference frames, $F_{i-1}$ and $F_{i+1}$ may be combined and projected to the same time instance as the current frame $F_i$ using an interpolation process to generate an interpolated frame. Multiple TIP modes may be supported. In one TIP mode, the interpolated frame may be used as an additional reference frame. A coding block of the current frame, $F_i$ can directly reference the interpolated frame and utilize the information coming from two different references with only the overhead cost of a single inter prediction mode. In another TIP mode, the interpolated frame can be directly assigned as the output of the decoding process for the current frame, $F_i$, while skipping any other traditional coding steps. This mode may have considerable coding and complexity benefits especially for low bitrate applications.

In some implementations, adaptive motion vector resolutions (AMVR) may be supported. In a specific example implementation, a total of 7 MV precisions (8, 4, 2, 1, ½, ¼, ⅛) may be supported. For each prediction block, an AMVR encoder may search all the supported precision values and signals the best precision to the decoder.

To reduce the encoder run-time, two MV precision sets are supported. Each precision set may contain, for example, 4 predefined precisions. The precision set may be adaptively selected at the frame level based on the value of maximum precision of the frame. The maximum precision may be signaled in the frame header. Table 4 summarizes example supported precision values based on the example frame level maximum precision.

TABLE 4

| Supported MV precisions in two sets | |
|---|---|
| Frame level maximum precision | Supported MV precisions |
| ⅛ | ⅛, ½, 1, 4 |
| ¼ | ¼, 1, 4, 8 |

In some example implementations of AMVR, there may be a frame level flag to indicate if the MVs of the frame contains sub-pel precisions or not. The AMVR may be enabled only if the value of cur_frame_force_integer_mv flag is 0. In the AMVR, if precision of the block is lower than the maximum precision, motion model and interpolation filters may not be signaled. If the precision of a block is lower than the maximum precision, motion mode is inferred to translation motion and interpolation filter is inferred to REGULAR interpolation filter. Similarly, if the precision of the block is either 4-pel or 8-pel, inter-intra mode may not be signaled and may be inferred to be 0.

Figure 12:
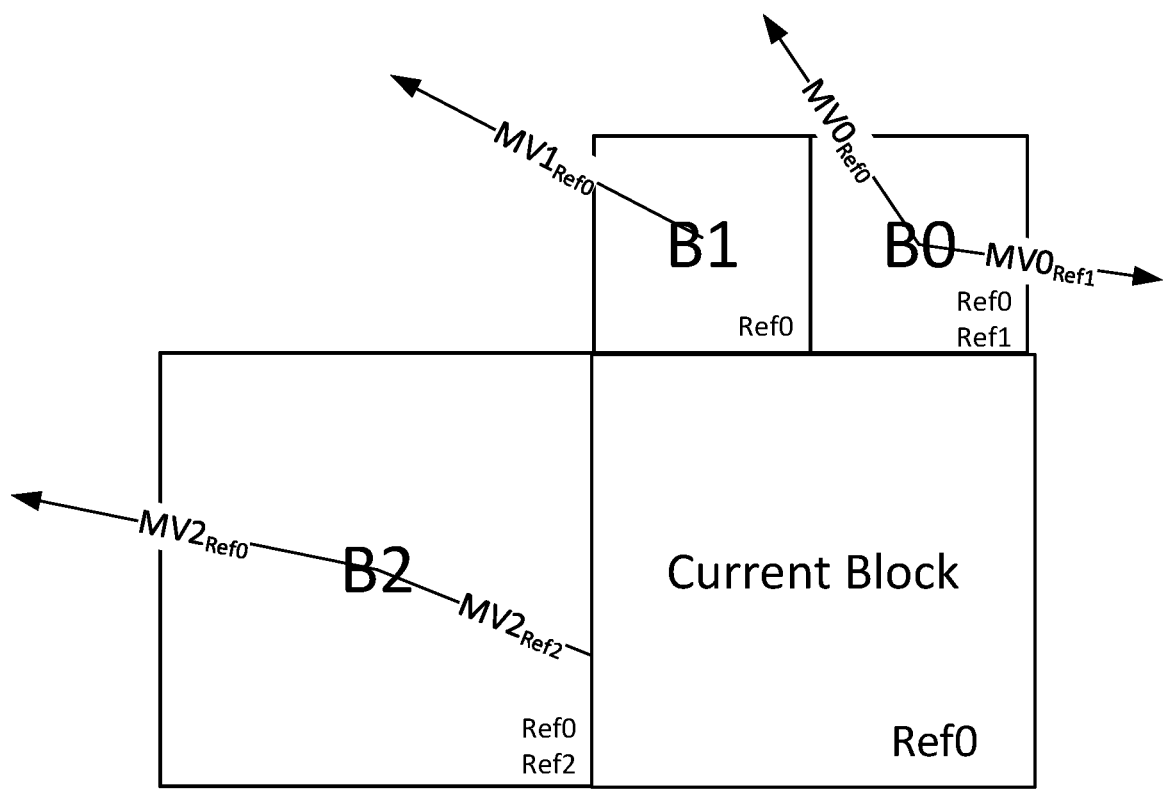
FIG. 12 shows an example for using neighboring motion vectors for generating motion vectors of sub-blocks.

In some example implementations, warped motion compensation may be applied. Unlike conventional motion compensation, which assumes a translational motion model between the reference and target block, warped motion may utilize an affine model, as conceptually illustrated in FIG. 12. For example, the affine motion model can be represented by Equation (3):

$$\begin{bmatrix} x' \\ y' \end{bmatrix} = \begin{bmatrix} a_1 & a_2 & a_3 \\ b_1 & b_2 & b_3 \end{bmatrix} \cdot \begin{bmatrix} x \\ y \\ 1 \end{bmatrix} \quad (3)$$

where [x, y] are the coordinates of the original pixel and [x', y'] are the warped coordinates of the reference block. It can be seen from Equation (1) that up to six parameters are used to specify the warped motion: $a_3$ and $b_3$ specify a conventional translational MV; $a_1$ and $b_2$ specify the scaling along the MV; and $a_2$ and $b_1$ specify the rotation.

In some example implementations, global motion information may be signaled for each inter reference frame, which includes a global motion type and several motion parameters. Example global motion types and numbers of associated parameters are listed in Table 5.

TABLE 5

Global motion types with associated number of parameters

| Global motion type | Number of parameters |
| --- | --- |
| Identity (zero motion) | 0 |
| Translational | 2 |
| Rotational | 4 |
| Zoom | 4 |
| General affine | 6 |

After signaling the reference frame index, if global motion is selected for use, the global motion type and the parameters associated with the given reference frame may be used for the current coding block.

Warped motion compensation may be applied locally at block level. In some example implementations, for an inter coding block, local warped motion may be allowed when the following conditions are met: (1) the current block uses single reference prediction; (2) the width or height of the coding block is greater than or equal to a threshold (e.g., 8); and (3) at least one of the adjacent neighboring blocks uses the same reference frame as the current block.

If such a local warped motion is used for the current block, the affine model parameters may be estimated by mean-squared minimization of a difference between the reference and modeled projections based on the MVs of the current block and its adjacent neighboring blocks. To estimate the parameters of local warped motion, for example, if the neighboring block uses the same reference frame as the current block, a projection sample pair of the center sample in the neighboring block and its corresponding sample in the reference frame is obtained. After that, three extra samples may be created by shifting the center position by a quarter sample in one or both dimensions. These extra samples may also be considered as projection sample pairs to ensure the stability of the model parameter estimation process.

The MVs of neighboring blocks, which are used to derive the motion parameters, may be referred to as motion samples. The motion samples may be selected from neighboring blocks that use the same reference frame as the current block. The warped motion prediction mode may be only enabled for blocks that use a single reference frame. For example, in FIG. 12, the MVs of neighboring blocks B0, B1, and B2 of the current block are referred as MV0, MV1, and MV2, respectively. As an example, the current block may be predicted using uni-prediction with reference frame Ref0; neighboring block B0 may be predicted using compound prediction with reference frames Ref0 and Ref1; neighboring block B1 is predicted using uni-prediction with reference frame Ref0; and neighboring block B2 is predicted using compound prediction with reference frames Ref0 and Ref2. The motion vector $MV0_{Ref0}$ of B0, $MV1_{Ref0}$ of B1 and $MV2_{Ref0}$ of B2 may be used as the motion samples for deriving the affine motion parameters of the current block.

In some example implementations, both global and local warp motion models may be supported. The global warp model, as described above, may be associated with each reference frame, where each of the four non-translational parameters may be provided with a predefined bit (e.g., 12-bit) precision and the translational motion vector may be coded in another predefined bit (e.g., 15-bit) precision. A coding block can choose to use the global warp directly and provide the reference frame index. The global warp model captures the frame level scaling and rotation, and hence primarily focuses on the rigid motion over the entire frame. In the local warp model at coding block level, e.g., a WARPED_CAUSAL mode, the warp parameters of the current block may be derived by fitting a model to nearby motion vectors using least-squares.

In another example for extending the warp motion compensation, e.g., in a WARP_EXTEND mode, the motion of a neighboring block may be extended smoothly into the current block, but with some ability to modify the warp parameters. This allows complex warping motions to be represented, spread across multiple blocks, while minimizing blocking artifacts. Such a mode applied to, e.g., NEWMV block, may be built on two example constraints: (1) the per-pixel motion vectors generated by this model should be continuous with the per-pixel motion vectors in a neighboring block (smoothness); and (2) the pixel at the center of the current block should have a per-pixel motion vector which matches the signaled motion vector for the block as a whole.

Figure 13:
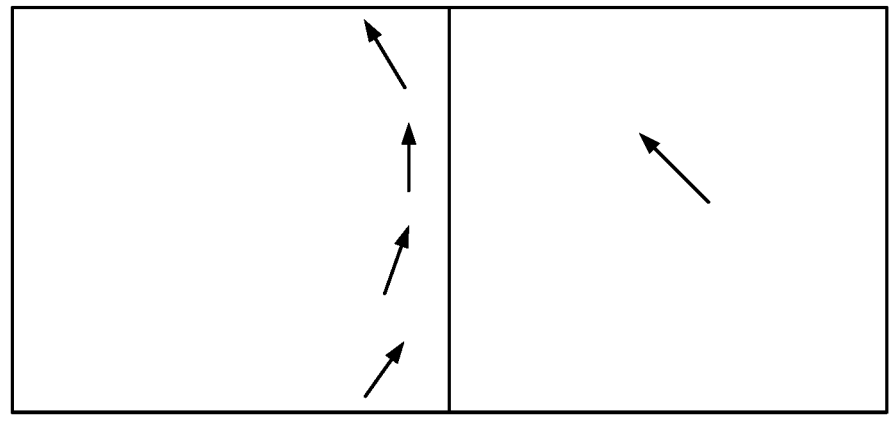
FIG. 13 illustrates pixel level motion vector restraints for an example sub-block motion compensation.

For example, if the block at the left of the current block is warped, then a model which fits the motion vectors as illustrated in FIG. 13 may be built. The two example constraints above imply certain equations involving the warp parameters of the neighboring block and the current block. These equations can then be solved to calculate the warp model for the current block. For example, mathematically, if (A, . . . , F) represents the neighbor's warp model and (A', . . . , F') represents the extended warp model, then constraint (1) above implies that, at each point along the common edge:

$$\begin{pmatrix} A' & B' \\ C' & D' \end{pmatrix}\begin{pmatrix} x \\ y \end{pmatrix} + \begin{pmatrix} E' \\ F' \end{pmatrix} = \begin{pmatrix} A & B \\ C & D \end{pmatrix}\begin{pmatrix} x \\ y \end{pmatrix} + \begin{pmatrix} E \\ F \end{pmatrix} \quad (4)$$

The points along the edge may have different values of y, but they all have the same value of x. This means that the coefficients of y must be the same on both sides (so B'=B and D'=D). In the meanwhile, the x coefficients give us two equations relating the other coefficients:

$$\begin{aligned} B' &= B \\ D' &= D \\ A'x + E' &= Ax + E \\ C'x + F' &= Cx + F \end{aligned} \quad (5)$$

where, in the last two equations if (5), x is the horizontal position of the vertical column of pixels, so is effectively a constant.

Constraint (2) above specifies that the motion vector at the center of the block must equal the one signaled using the NEWMV mechanism. This gives two further equations, resulting in a system of six equations in six variables which has a unique solution.

These equations can be solved both in software and in hardware and the solution boils down to basic additions/subtractions/multiplications, and divisions by powers of 2. As such, this mode may be significantly less complex than least-squares based local warped motion compensation.

In the example implementations above, there may be multiple neighboring blocks which could be used to extend from, and in that case a choice as to which block to extend from may need to be made. This may be a similar problem to one encountered in motion vector prediction (e.g., there may be several possible motion vectors from nearby blocks for election as the base for NEWMV coding). Methods used for motion vector prediction may be extended to handle the needs of WARP_EXTEND above. This may be done by tracking the source of each motion vector prediction. Then, WARP_EXTEND may be only enabled if the selected motion vector prediction is taken from a directly neighboring block. Then, that block may be used as the single "neighboring block" in the rest of the algorithm.

In some situations, the neighbor's warp model may already be good as-is, without needing any further modification. To make this case cheaper to code, the WARP_EXTEND mode may be allowed to be used for NEARMV blocks. The neighbor selection may be the same as for NEWMV, except in this case the neighbor may be required to be warped, not just translational. But if this is true, and the WARP_EXTEND mode is selected, then the neighbor's warp model parameters may be copied for the current block.

In some example implementations, a motion mode referred to as WARP_DELTA may be used. In this mode, the block's warp model may be coded as a delta from a predicted warp model, similarly to how motion vectors are coded as a delta from a predicted motion vector. The prediction may be sourced from either the global motion model (if any), or a neighboring block.

To avoid having multiple ways to encode the same predicted warp model, the following example restrictions may be applied: if the mode is NEARMV or NEWMV, then the same neighbor selection logic as described for WARP_EXTEND may be used; if this results in a neighboring block which is warped, then that block's model (without applying the rest of the WARP_EXTEND logic) may be used as the prediction; and otherwise, the global warp model may be used as a base. Then, a delta for each of the non-translational parameters may be coded. Finally, the translational part of the model may be adjusted so that the per-pixel motion vector at the center of the block matches the block's overall motion vector.

As the example implementation above involves explicitly coding a delta per warp parameter, it may use more bits to encode than the other warp modes. As such, WARP_DELTA may be disabled for blocks smaller than a pretrained threshold, e.g., 16×16. However, the decode logic is relatively simple but can represent more complex motion that the other warp modes cannot.

In some of other example implementations above for video blocks may be divided into sub-blocks, and warped motion compensation may be applied at sub-block level. For example, the location of the sub-blocks in the current block may be warped (translational, rotational, scaling, for example). Warped motion compensation may be performed by warping the subblocks each as a whole, but performing regular motion compensation for each sub-block with or without Prediction Refinement with Optical Flow (PROF). In such implementations, motion vectors associated with each of the sub-blocks may be derived based on neighboring block motion information. Such sub-block motion compensation may be applied only to single inter prediction mode, and temporal motion information with respect to the current block may not be used for deriving the sub-block motion vector. Because the sub-blocks of the current block may be associated with different motion vectors, such implementations effectively capture sub-block level warping.

In some further extended example implementations, the derivation of the sub-block motion vectors may be based on not only the motion vectors of neighboring blocks, but also possibly on temporal motion vector predictor of the current block and/or motion vectors from reference pictures, as described in further detail below.

In further detail, for sub-block motion compensation that may capture sub-block level warping, a video block to be inter-predicted may be divided into sub-blocks with each subblock being associated with a motion vector. A motion vector for each of the sub-blocks with respect to a particular reference frame may be determined/derived according to motion vectors associated with one or more of spatial neighboring blocks of the video block to be inter-predicted in the current frame, or motion vectors from reference pictures of the current frame, or temporal motion vector predictor of the current block.

In some example implementations, the determination of motion vectors of various sub-blocks in a current block to be inter predicted may be performed in two stages. In the first stage, a set of virtual sub-blocks surrounding the current block may be attributed with motion vectors (referred to as intermediate motion vectors for reasons that will become clear below). Each of these virtual sub-blocks is associated with a neighboring sub-block position relative to the current block. The virtual blocks may be alternatively referred to as placeholder neighboring sub-blocks of the current block (as placeholders for attributed position-sensitive intermediate motion vectors). In the second stage, one or more of the position-sensitive intermediate motion vectors and their virtual sub-block position relative to the current block are used to determine/calculate/derive a motion vector for each of the sub-blocks in the current block.

Figure 14:
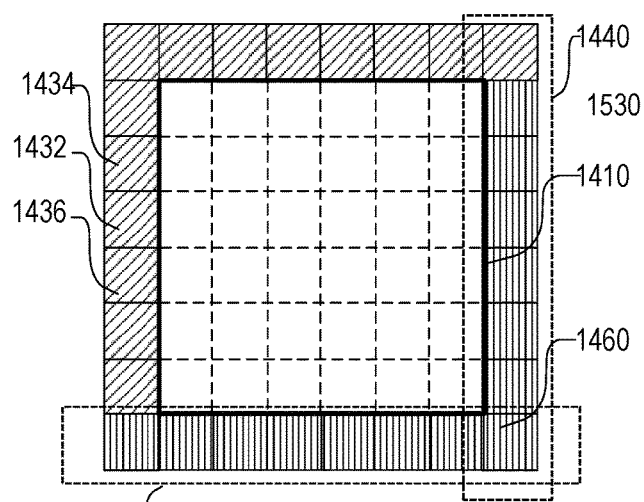
FIG. 14 illustrates example neighboring virtual sub-block for motion vector attribution for sub-block motion compensation.

The example virtual or place-holder sub-block implementation above is illustrated in FIG. 14. As shown in FIG. 14, a current video block 1410 in a current frame represented by the bold boundary lines may be predicted under sub-block motion compensation. As such, the current video block 1410 may be divided into a plurality of sub-blocks with a particular predefined or adaptively determined sub-block size. In the Example of FIG. 14, the current block 1410 may be divided into 36 equal sub-blocks, as delineated by the dashed lines shown within the current block 1410. Correspondingly, the virtual sub-blocks or the placeholder neighboring sub-blocks surrounding the current block 1410 may established, as shown by the textured areas of FIG. 14. Each or some of these virtual sub-blocks may then be attributed with motion vectors as described in detail below. These attributed motion vectors may then be selectively used to derive sub-block level motion vectors of the sub-blocks within the current block 1410.

The virtual sub-blocks surrounding the current block 1410 may be designated by their relative neighboring positions with respect to the current block 1410. Some of the virtual subblocks 1410, for example, may be associated with positions corresponding to spatially neighboring sub-blocks of the current block 1410 in the current frame that have already been reconstructed, such as the virtual sub-blocks located on the above side and on the left side of the current block 1410, as indicated by diagonal line texture. If the neighboring sub-blocks of the current block 1410 corresponding to these virtual or placeholder sub-blocks in position are coded in inter-prediction mode, then their motion vector would have been identified and known during their reconstruction. However, other virtual subblocks, e.g., the ones below the bottom side and to the right of the right side of the current block 1410, as indicated by the virtual sub-blocks with vertical lines texture in FIG. 14 and denoted as 1420 and 1440, respectively, may positionally correspond to neighboring sub-blocks of the current block 1410 in the current frame that have not been reconstructed. Thus, neighboring sub-blocks of the current block 1410 corresponding to virtual sub-blocks 1420 and 1440 in position would not have been reconstructed when the current block 1410 is being processed. The motion vectors of these neighboring sub-blocks if they are inter predicted, thus would not have been known yet.

Each of the already reconstructed neighboring block or sub-blocks of the current block 1410 in the current frame corresponding in position to the virtual subblocks of FIG. 14 with diagonal texture may either be inter predicted or intra predicted, and thus may or may not be associated with a known motion vector. In addition, each of these neighboring blocks or sub-blocks of the current block 1410 may be associated with co-located reference block or sub-block in a reference frame, or associated with a temporal block or sub-block in a temporal reference frame (e.g., temporal prediction frames interpolated from reference frames) that may or may not be associated with any motion vectors (depending on whether these reference sub-blocks or temporal sub-blocks are inter predicted or intra predicted).

Each of the not-yet-reconstructed neighboring block or sub-block of the current block 1410 in the current frame corresponding in position to the virtual or placeholder sub-blocks 1420 and 1440 of FIG. 14 with vertical texture, while not being associated with any already reconstructed motion vector of the current frame, may nevertheless be associated with already reconstructed co-located blocks or sub-blocks in a reference frame or in a temporal reference frame (e.g., temporal prediction frames interpolated from reference frames) that may or may not be associated with already-reconstructed motion vectors (depending on whether these temporal sub-blocks are inter predicted or intra predicted).

Some of the virtual sub-blocks in FIG. 14 may correspond in position to inter-predicted spatial neighboring blocks or subblocks of the current block 1410 or co-located temporal blocks or sub-blocks, which may belong to a prediction unit larger than the size of a sub-block. As such, more than one adjacent virtual sub-blocks may correspond to a same neighboring prediction unit or temporal prediction unit, and hence a same reconstructed motion vector.

As generally described above, in the first stage, the virtual sub-blocks surrounding the current block 1410 in FIG. 14 at different positions may first be attributed with motion vectors, before these attributed motion vectors can be used to determine/calculate/derive motion vectors for the sub-blocks within the current block 1410. In some example implementations, the x-component (horizontal component) of a sub-block motion vector in the current block 1410 may be calculated or derived based on the x-components (horizontal components) the motion vectors of neighboring blocks and/or the temporal motion vector predictor of current block and/or motion vectors from reference pictures. Particularly, the x-component (horizontal component) of a sub-block motion vector in the current block 1410 may be calculated or derived based on the x-components (horizontal components) of one or more of the motion vectors attributed to the virtual sub-blocks. Likewise, the y-component of a sub-block motion vector of the current block 1410 may be calculated or derived based on the motion vectors of neighboring blocks and/or the temporal motion vector predictor of current block and/or motion vectors from reference pictures. In particular, the y-component (horizontal component) of a sub-block motion vector in the current block 1410 may be calculated or derived based on the y-components (vertical components) of one or more of the motion vectors attributed to the virtual sub-blocks.

Each of these virtual sub-blocks, for example, may be allocated or attributed with, if available, an already-reconstructed motion vector of either a correspondingly located spatial neighboring block/sub-block of the current block 1410 in the current frame, a co-located block/sub-block from a reference frame, or a co-located block/sub-block from a temporal reference frame interpolated, e.g., from the reference frames of the current frame, or temporal motion vector predictor of the current block. Determination of which motion vector to select from these candidate motion vectors (if available) for attribution to a virtual sub-block position may following a predefined availability checking order of these potential candidate motion vector options. Selection from available candidate motion vectors for the virtual sub-blocks may be referred to as a motion vector collection process for the virtual sub-blocks. In other words, motion vectors are collected from the candidate motion vectors and selectively attributed to these virtual sub-blocks. If no collectable motion vectors are available for a virtual sub-block, a motion vector for such a virtual sub-block may be padded or calculated following one of the example manners described in further detail below. The collected or otherwise padded or calculated motion vectors for the virtual sub-blocks together with their positions may then be used to derive sub-block motion vectors of the sub-blocks of the current block 1410 in the second stage.

In some example implementations, when collecting/selecting motion vectors for attribution to the virtual sub-blocks from candidate motion vectors, the candidate motion vectors (already reconstructed current neighboring or temporal motion vectors) may be directly fetched according to a predefined availability checking order.

In some example implementations above, the motion vector of a virtual sub-block may otherwise be padded/derived from one of its neighboring virtual sub-blocks if its own candidate motion vector(s) for collection or attribution are not available from its spatially co-located block/sub-block in the current frame or a temporal block/sub-block. For example, in FIG. 14, if candidate motion vector for the virtual sub-block 1432 is not available from the corresponding co-located block/sub-block in the current frame or any temporal blocks/sub-blocks (e.g., these blocks/sub-blocks are intra rather than inter predicted), then candidate motion vectors of the neighboring virtual sub-block 1434 or 1436 (neighboring to the virtual sub-block 1432 among the set of virtual sub-blocks) may be used to pad or derive the motion vector attributed to the virtual sub-block 1432.

In some example implementations, if a motion vector of a block/sub-block in the current frame corresponding to a virtual sub-block in position is not available, then a temporal motion vectors of co-located sub-blocks in reference frames may be checked first as candidate motion vectors for attribution to the virtual sub-block. If such co-located temporal motion vectors are available, then they are collected with a predetermined availability checking order and used for attribution to the virtual sub-block. Otherwise, the motion vector attributed to its neighboring virtual sub-blocks may be used for padding or derivation of its motion vector.

Figure 16:
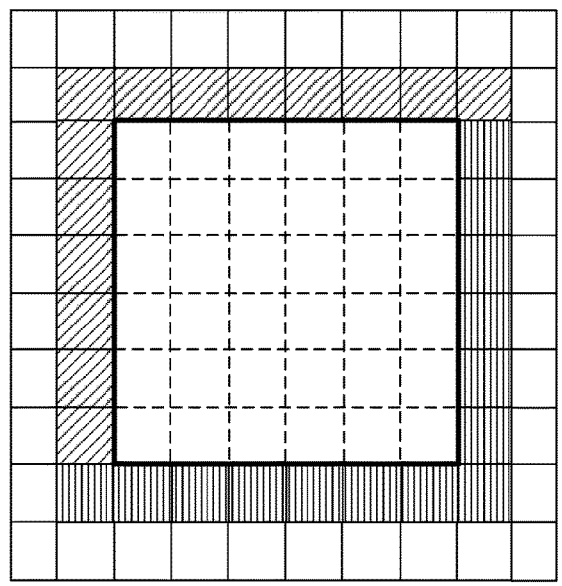
FIG. 16 illustrate next neighboring sub-blocks for use in sub-block motion compensation.

In some example implementations, if a motion vector of a block/sub-block in the current frame corresponding to a virtual sub-block in location is not available, motion vectors of second tier spatially neighboring blocks/sub-blocks of the current block 1410 may be searched for candidate motion vector(s) for attribution to the virtual sub-block. For example, the second-tier neighboring block/sub-block may refer to an immediate outer block/neighbor sub-block of the virtual sub-blocks in position in the current frame. If such second-tier neighboring motion vectors in the current frame are also not available, then a motion vector attributed to the virtual neighboring sub-block may be padded or derived as described above. FIG. 16 shows the second-tier neighboring sub-block positions relative to the current block and the virtual sub-blocks as the outer sub-blocks surrounding the virtual sub-blocks.

In some example implementations, the order of availability check of candidate motion vector may follow spatial neighboring sub-blocks in the current frame, next-tier spatial neighboring sub-blocks in the current frame, temporal sub-blocks in one or more reference frames.

In some example implementations, the order of availability check of candidate motion vector may follow spatial neighboring sub-blocks in the current frame, temporal sub-blocks in one or more reference frames, and next-tier spatial neighboring sub-blocks in the current frame, or any other combination and order.

In some other example implementations, if a motion vector of block/sub-block in the current frame corresponding to a virtual sub-block in position is not available, the motion vector attributed to the virtual sub-block may set to a default value, such as zero motion vector value.

In some example implementations, for the bottom right virtual sub-block 1460 (as indicate as the intersection of the bottom sub-blocks 1420 and right sub-blocks 1440 in FIG. 14) that is not associated with an co-located sub-block of the current frame with an already-reconstructed motion vector, temporal motion vectors of sub-blocks co-located with this bottom-right virtual sub-block 1490 in reference frames may be directly fetched and attributed to this virtual sub-lock if they are available. Otherwise, if the co-located temporal motion vectors are not available, a weighted average of (1) the attributed motion vectors for the bottom left virtual sub-block and the top-right virtual sub-block, or (2) temporal motion vectors for sub-blocks in the reference frames corresponding to the bottom left virtual sub-block and the top-right virtual sub-block in spatial position, may be used as a motion vector predictor for attribution to the bottom-right virtual sub-block. In some other implementations, if the co-located temporal motion vectors are not available, then temporal motion vector predictors for the bottom-right virtual sub-block may be considered absent and may not be used for attribution of the motion vector for the bottom-right virtual sub-block.

In some example implementations, only the motion vectors for the virtual sub-blocks at the top left, top right, bottom left, and bottom right corner positions in FIG. 14 are collected from the spatial/temporal neighboring sub-block or blocks as described above, and motion vectors attributed to other virtual sub-blocks in FIG. 14 in between these corner virtual sub-blocks may be interpolated using, for example, bilinear interpolation or other predefined nonlinear weighted interpolation of the attributed motion vectors of the corner virtual sub-blocks. For example, virtual sub-blocks between the top-left and bottom-left corner virtual sub-blocks may be attributed by interpolation or nonlinear weighting of the attributed motion vectors for the top-left and bottom-left corner virtual sub-blocks. Likewise, virtual sub-blocks between the top-left and top-right corner virtual sub-blocks may be attributed by interpolation or nonlinear weighting of the attributed motion vectors for the top-left and top-right corner virtual sub-blocks. Likewise, virtual sub-blocks between the top-right and bottom-right corner virtual sub-blocks may be attributed by interpolation or nonlinear weighting of the attributed motion vectors for the top-right and bottom-right corner virtual sub-blocks. Likewise, virtual sub-blocks between the bottom-right and bottom-left corner virtual sub-blocks may be attributed by interpolation or nonlinear weighting of the attributed motion vectors for the bottom-right and bottom-left corner virtual sub-blocks.

In some example implementations, the virtual sub-blocks surrounding the current block may be segmented by the virtual sub-blocks having available collected candidate motion vectors as described above, attributed motion vectors for virtual sub-block segments in between that do not have collectable candidate motion vectors may be derived via linear or nonlinear interpolation of the collected motion vectors at the two ends of each of these virtual sub-block segments.

Figure 15:
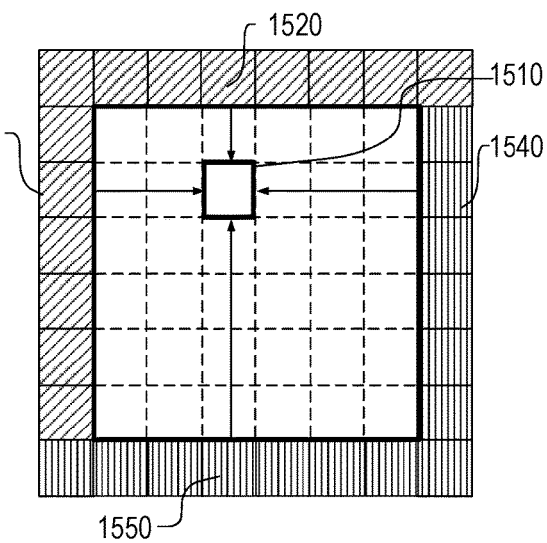
FIG. 15 illustrates example sub-block motion vector generation based on motion vectors attributed to neighboring virtual sub-block.

As shown by FIG. 15, and turning to the second stage for determining a motion vector for a sub-block of the current block, e.g., subblock 1510, based on the attributed motion vectors in the surrounding virtual sub-blocks, in some example implementations, one or multiple attributed motion vectors selected from the attributed motion vectors for the above virtual sub-block 1520, left virtual sub-block 1530, right virtual sub-block 1540, and bottom virtual sub-block 15 50 may be weighted averaged to calculate the motion vector for sub-block 1510. The selection of which ones of virtual sub-blocks from the set of virtual sub-block positions (e.g., the set of above, left, right, and bottom) for such calculation may be predetermined or dynamically signaled at various levels (block, picture, frame, etc.).

In the example implementation above with respect to FIG. 15, a bi-linear equation can be used to generate a motion vector of each sub-block of the current block.

In some example implementations, multiple sets of weighting factors may be pre-defined for calculating the motion vectors for the sub-blocks the current block. For example, selection of a set of weighting factors from the predefined sets of weighting factors for calculation of a motion vector for a particular sub-block may depend on relative position of the sub-block within the current block.

For another example, selection of a set of weighting factors from the predefined sets of weighting factors for calculation of a motion vector for a particular sub-block may depend on relative position of the sub-block within the current block and/or a difference between the neighboring motion vectors, e.g., difference between the selected attributed motion vectors of the virtual sub-blocks for use and the attributed motion vectors of their neighboring virtual sub-blocks.

For example, if the selected attribute motion vectors for calculating the motion vector for a sub-block are close (small differences, e.g., smaller than a threshold difference), then these motion vectors may be averaged to obtain the motion vector for the sub-block regardless of the position of the sub-block. Otherwise, distances between the sub-block and the selected virtual sub-blocks (the lengths of the arrows in FIG. 15) may be used as weights for calculating the motion vector for the sub-block based on the selected attributed motion vectors of the selected virtual sub-blocks (e.g., virtual subblocks 1520, 1530, 1540, and 1550 of FIG. 15).

In some other example implementations, the attributed motion vectors to the virtual sub-blocks may be further adjusted with motion vector differences (MVD) before being used to calculate the motion vectors for the sub-blocks in the current block. Such motion vector differences may be determined and generated by the encoder and signaled in the bitstream. The decoder, correspondingly, may then use the signaled MVD to adjust the attributed motion vectors (as collected or derived in the decoder according the various example implementations above) with the signaled MVD and use the adjusted attributed motion vectors of the virtual sub-blocks for the calculation of the motion vectors fo the sub-blocks of the current block.

In some example implementations, zero or one MVD may be signaled for a block containing multiple subblocks. If one MVD is signaled, it may be applied to adjustment of the attributed motion vector of a virtual sub-block of a predetermined position. For example, the predetermined position may be bottom right. In some alternative implementations, the position for applying the signaled MVD may be additionally signaled among a set of positions (e.g., bottom-right, bottom-left, top-left, and top-right, or any combination thereof). For example, the set of positions may be predefined and indexed and the signal of the positions may be achieved via signaling of one of the indexes.

In some specific example implementations, two MVDs may be signaled, the first MVD may be applied to the attributed motion vector of the bottom-left virtual sub-block, whereas the second MVD may be applied to the attributed motion vector of the top-right virtual sub-block.

In some other example implementations, a fixed or variable number up to a predefined number of MVDs may be signaled for a block, and may be applied to adjust the attributed motion vectors of virtual sub-block at a predefined set of ordered positions, e.g., the first, second, and . . . signaled MVDs may map to an ordered list of virtual sub-block positions. Alternatively, the virtual sub-block positions for a plurality of signaled MVDs may be additionally signaled rather than predefined.

The adjustment via signaled MVDs to the attributed motion vectors of some selected virtual sub-block positions may help provide sub-block motion vectors for the current block that are more precise, leading to improved coding gains. The example positions are chosen above for the signaling of the MVDs take into consideration that these positions may be used for interpolation of attributed motion vectors of other virtual sub-blocks. Therefore, for such interpolations, adjusted attributed motion vectors rather than unadjusted attributed motion vectors at these virtual sub-block positions may be used.

In some example implementations, the signaling of the MVD for the purpose of adjusting the attributed motion vectors for the virtual sub-blocks above, including but not limited to related syntax and contexts may be the same as signaling for the NEWMV inter prediction mode.

In some example implementations, the signaling of the MVD for the purpose of adjusting the attributed motion vectors for the virtual sub-blocks above, including but not limited to related syntax and contexts may be the same as signaling for the AMVDNEWMV mode, wherein adaptive MVD resolution is applied.

In some example implementations, the signaling of the MVD for the purpose of adjusting the attributed motion vectors for the virtual sub-blocks above, including but not limited to related syntax and contexts, may be based on the inter prediction modes of current block. In other words, the signaling syntax or context for these MVDs may change from block to block depending on the inter prediction mode of the blocks.

In some example implementations of the sub-block motion compensation, the MVP/DRL index of current block may not be signaled to the bitstream and may be derived as zero at both the encoder side and decoder side. In other words, under the sub-block motion compensation above, the motion vector derivation for the sub-blocks rely on neighboring block motion vectors and temporal vectors and thus there may be no need to reference particular signaled motion vector predictor or DRL index.

In some example implementations, the smooth sub-block motion vector or compensation mode above may be signaled as one of the inter-prediction modes, parallel to inter prediction mode such as NEARMV, NEWMV, GLOBALMV, NEAR_NEARMV, NEAR_NEWMV, NEW_NEARMV, NEW_NEWMV, and GLOBAL_GLOBALMV modes.

In some example implementations, the smooth sub-block motion vector or compensation mode above may be signaled as one of a plurality of motion modes, like Overlapped Block Motion Compensation (OBMC) or warped motion mode, all under various inter-prediction mode.

In some example implementations, one high level syntax may be signaled in sequence level/frame level/slice level/super block level to indicate whether the smooth sub-block motion compensation is enabled or not.

In some example implementations, the smooth sub-block motion vector or compensation mode above may be signaled only for the skip mode. An example decoding code for parsing information related to skip mode and smooth sub-block motion mode is shown below.

--- mbmi->skip_mode = read_skip_mode(cm, xd, mbmi->segment_id, r);
  mbmi->fsc_mode[PLANE_TYPE_Y] = 0;

-continued

```
    mbmi->fsc_mode[PLANE_TYPE_UV] = 0;
#if CONFIG_CWP
    mbmi->cwp_idx = CWP_EQUAL;
#endif // CONFIG_CWP
#if CONFIG_WARP_REF_LIST
    mbmi->warp_ref_idx = 0;
    mbmi->max_num_warp_candidates = 0;
#endif // CONFIG_WARP_REF_LIST
#if CONFIG_NEW_CONTEXT_MODELING
    mbmi->use_intrabc[0] = 0;
    mbmi->use_intrabc[1] = 0;
#endif // CONFIG_NEW_CONTEXT_MODELING
#if CONFIG_SKIP_TXFM_OPT
    if (!mbmi->skip_mode) {
        inter_block = read_is_inter_block(cm, xd, mbmi->segment_id, r);
    }
#if CONFIG_SUBBLOCK
    if (mbmi->skip_mode) {
        subblock = read_is_subblock (cm, xd, mbmi->segment_id, r);
    }
```

In the reference syntax above, a bitstream is parsed to determine whether a skip mode enabled for a block. If it enabled, a flag "subblock" is read from the bitstream, which indicate whether the block is to be predicted under a sub-block mode (e.g., a smooth sub-block mode).

Figure 17:
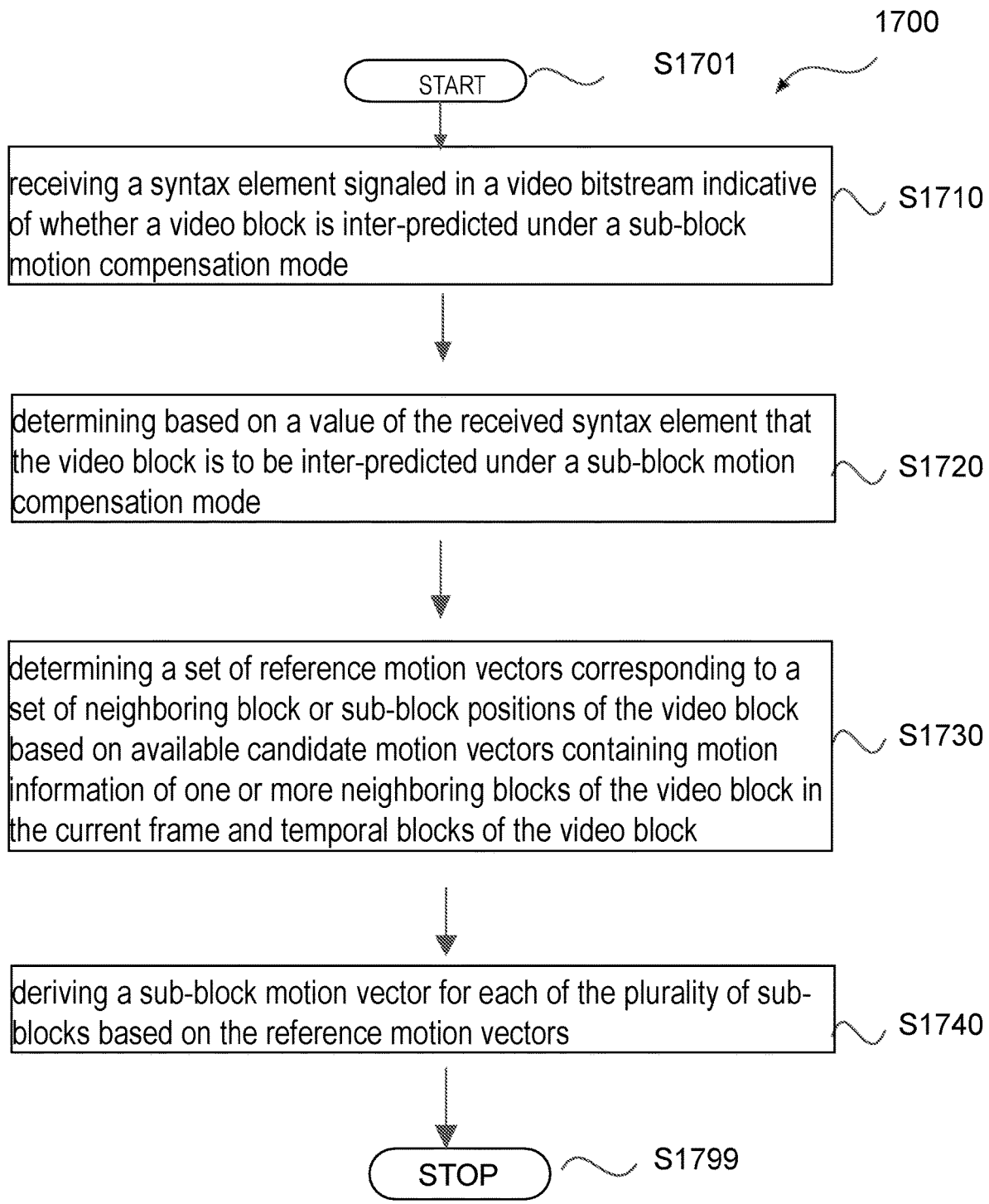
FIG. 17 shows an example logic flow for a method for sub-block motion compensation.

FIG. 17 illustrates an example logic flow 1700 according the implementations above. The logic flow 1700 starts at S1701. In S1710, a syntax element signaled in a video bitstream is received, the syntax element being indicative of whether the video block is inter-predicted under a sub-block motion compensation mode. In S1720, whether the video block is to be inter-predicted under a sub-block motion compensation mode is determined based on a value of the received syntax element. In S1730, a set of reference motion vectors corresponding to a set of neighboring block or sub-block positions of the video block is determined based on available candidate motion vectors containing motion information of one or more neighboring blocks of the video block in the current frame and temporal blocks of the video block. In S1740, a sub-block motion vector for each of the plurality of sub-blocks is derived based on the reference motion vectors. The logic flow 1700 stops at S1799.

Operations above may be combined or arranged in any amount or order, as desired. Two or more of the steps and/or operations may be performed in parallel. Embodiments and implementations in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block. The term block may be interpreted as a prediction block, a coding block, or a coding unit, i.e. CU. The term block here may also be used to refer to the transform block. In the following items, when saying block size, it may refer to either the block width or height, or maximum value of width and height, or minimum of width and height, or area size (width*height), or aspect ratio (width:height, or height: width) of the block.

The techniques described above, can be implemented as computer software using computer-readable instructions and physically stored in one or more computer-readable media. For example, FIG. 18 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
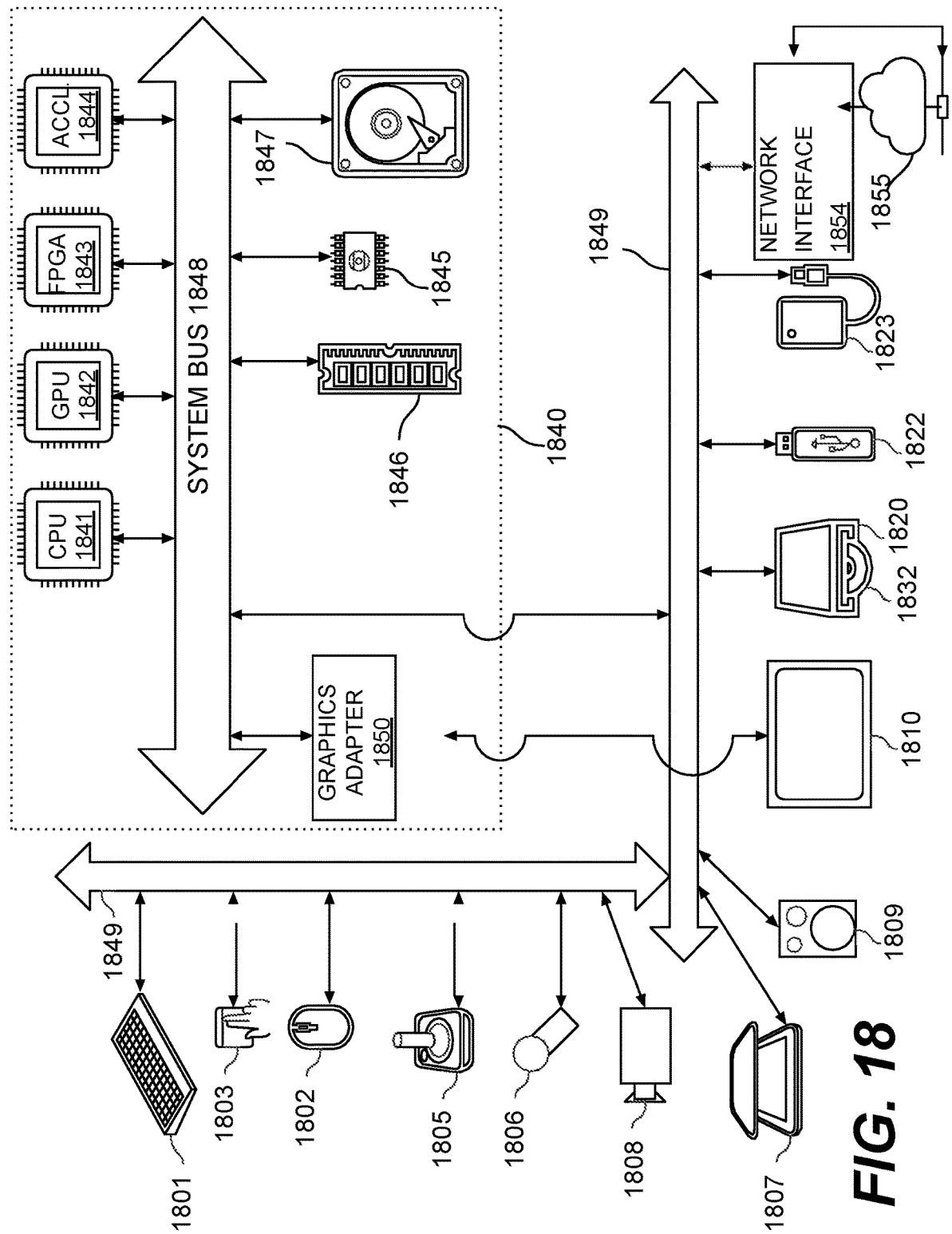
FIG. 18 shows a schematic illustration of a computer system in accordance with example embodiments of this disclosure.

The components shown in FIG. 18 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface (1854) to one or more communication networks (1855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), graphics adapters (1850), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). In an example, the screen (1810) can be connected to the graphics adapter (1850). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding a video block comprising a plurality of sub-blocks of a current frame in a video bitstream, the method comprising:
   receiving a syntax element signaled in the video bitstream indicative of whether the video block is inter-predicted under a sub-block motion compensation mode, wherein the sub-block motion compensation mode is a parallel mode to an affine warp motion mode and an overlapped Block Motion Compensation (OBMC) mode;
   determining based on a value of the received syntax element that the video block is to be inter-predicted under the sub-block motion compensation mode;
   determining a set of reference motion vectors corresponding to a set of neighboring block or sub-block positions of the video block based on available candidate motion vectors containing motion information of one or more neighboring blocks of the video block in the current frame and temporal blocks of the video block; and
   deriving a sub-block motion vector for each of the plurality of sub-blocks by selecting reference motion vectors from the set of reference motion vectors for each of the sub-blocks at a sub-block level and calculating the sub-block motion vector for each of the plurality of sub-blocks based on the reference motion vectors selected at the sub-block level.

2. The method of claim 1, wherein deriving the sub-block motion vector for each of the plurality of sub-blocks based on the reference motion vectors comprises:
   deriving horizontal component of the sub-block motion vector based on horizontal components of the reference motion vectors; and
   deriving vertical component of the sub-block motion vector based on vertical components of the reference motion vectors.

3. The method of claim 1, wherein, for each of the at least one of the set of neighboring block or sub-block positions, a reference motion vector is determined by selecting from the available candidate motion vectors comprising and in a predetermined availability-checking order of:
   a first motion vector determined from a neighboring block of the video block in the current frame, the neighboring block being spatially co-located with the neighboring block or sub-block position; and
   a second motion vector derived based on a temporal block spatially co-located with the neighboring block or sub-block position.

4. The method of claim 1, wherein, for each of at least one of the set of neighboring block or sub-block positions, a reference motion vector is determined by selecting from the available candidate motion vectors comprising and in a predetermined availability-checking order of:
   a first motion vector determined from a neighboring block of the video block in the current frame, the neighboring block being spatially co-located with the neighboring block or sub-block position; and
   a second motion vector determined from a secondary neighboring block of the video block in the current frame adjacent to the neighboring block or sub-block position.

5. The method of claim 1, wherein for a neighboring block or sub-block position with no available candidate motion vectors, the corresponding reference motion vector is padded from a reference motion vector associated with its adjacent neighboring block or sub-block position.

6. The method of claim 1, wherein a reference motion vector associated with a bottom-right neighboring block or sub-block position is:
   fetched from co-located temporal motion vectors if available; and
   otherwise, derived as a weighted average of reference motion vectors associated with a top- right neighboring block or sub-block position and a bottom-left neighboring block or sub-block position.

7. The method of claim 1, wherein a reference motion vector associated with a bottom-right neighboring block or sub-block position is:
   fetched from co-located temporal motion vectors if available; and
   otherwise not used for deriving the sub-block motion vector for each of the plurality of sub-blocks.

8. The method of claim 1, wherein:
   the set of neighboring block or sub-block positions comprise corner positions including a top-left corner position, a top-right corner position, and bottom right corner position;
   the reference motion vectors associated with the corner positions are selected from the available candidate motion vectors; and
   other reference motion vectors associated with neighboring block or subblock positions other than the corner positions are interpolated from the reference motion vectors associated with the corner positions.

9. The method of claim 1, wherein deriving the sub-block motion vector for a sub- block of the video block based on the reference motion vectors comprises:

selecting from the set of reference motion vectors, a subset of reference motion vectors of neighboring block or sub-block positions that are left, top, right, and bottom to the sub-block; and deriving the sub-block motion vector for the sub-block based on the subset of reference motion vectors.

10. The method of claim 9, wherein the sub-block motion vector for the sub-block is derived from the subset of reference motion vectors using a bi-linear equation or using a weighted average of the subset of reference motion vectors.

11. The method of claim 10, wherein a set of weighting factors for deriving the sub-block motion vector form the subset of reference motion vectors are selected among a predetermined or signaled multiple sets of weighting factors.

12. The method of claim 1, further comprising:
parsing the video bitstream to extract one or more motion vector deltas; and
applying the motion vector deltas to adjust at least one of the set of reference motion vectors before deriving the sub-block motion vector based thereof.

13. The method of claim 12, wherein the one or more motion vector deltas are attributed and applied to neighboring block or sub-block positions via a predetermined order.

14. The method of claim 12, further comprising parsing the video bitstream to extract a signaling identifying neighboring block or sub-block positions corresponding to the at least one of the set of reference motion vectors for the one or more motion vector deltas to be applied.

15. The method of claim 12, wherein the one or more motion vector deltas are signaled in the video bitstream using a same syntax and context as a motion vector difference (MVD) signaling or an adaptive-resolution MVD signaling.

16. The method of claim 1, the sub-block motion compensation mode is signaled only when a skip mode is enabled for the video block.

17. The method of claim 1, wherein the sub-block motion compensation mode comprises a smooth sub-block motion compensation mode.

18. An electronic device, comprising a memory for storing instructions, and a processor for executing the stored instructions to:
to determine that a video block in a current frame is to be inter-predicted under a sub-block motion compensation mode, wherein the sub-block motion compensation mode is a parallel mode to an affine warp motion mode and an overlapped Block Motion Compensation (OBMC) mode;
determine a plurality of sub-blocks of the video block;
determine a set of reference motion vectors corresponding to a set of neighboring block or sub-block positions of the video block based on available candidate motion vectors including motion information of one or more neighboring blocks of the video block in the current frame and temporal blocks of the video block; and
derive a sub-block motion vector for each of the plurality of sub-blocks by selecting reference motion vectors from the set of reference motion vectors for each of the sub-blocks at a sub-block level and calculating the sub-block motion vector for each of the plurality of sub-blocks based on the reference motion vectors selected at the sub-block level.

19. A non-transitory computer readable storage medium for storing a video bitstream that is generated by a video encoding method, the video encoding method comprising:
signaling a syntax element in the video bitstream indicative of whether a video block of a current frame is inter-predicted under a sub-block motion compensation mode, wherein the sub-block motion compensation mode is a parallel mode to an affine warp motion mode and an overlapped Block Motion Compensation (OBMC) mode;
determining a plurality of sub-blocks of the video block;
determining a set of reference motion vectors corresponding to a set of neighboring block or sub-block positions of the video block based on available candidate motion vectors including motion information of one or more neighboring blocks of the video block in the current frame and temporal blocks of the video block;
deriving a sub-block motion vector for each of the plurality of sub-blocks of the video block by selecting reference motion vectors from the set of reference motion vectors for each of the sub-blocks at a sub-block level and calculating the sub-block motion vector for each of the plurality of sub-blocks based on the reference motion vectors selected at the sub-block level;
encoding each of the plurality of the sub-blocks based on the sub-block motion vector in the video bitstream.

\* \* \* \* \*